United States Patent
Nakanishi et al.

(10) Patent No.: US 8,933,895 B2
(45) Date of Patent: Jan. 13, 2015

(54) DISPLAY DEVICE WITH TOUCH DETECTION FUNCTION, DRIVE CIRCUIT, DRIVING METHOD OF DISPLAY DEVICE WITH TOUCH DETECTION FUNCTION, AND ELECTRONIC UNIT

(75) Inventors: Takayuki Nakanishi, Kanagawa (JP); Yoshitoshi Kida, Kanagawa (JP); Koji Noguchi, Kanagawa (JP); Hiroshi Mizuhashi, Kanagawa (JP); Koji Ishizaki, Tokyo (JP)

(73) Assignee: Japan Display West Inc., Aichi-Ken (JP)

( * ) Notice: Subject to any disclaimer, the term of this patent is extended or adjusted under 35 U.S.C. 154(b) by 246 days.

(21) Appl. No.: 13/067,934

(22) Filed: Jul. 8, 2011

(65) Prior Publication Data

US 2012/0044195 A1  Feb. 23, 2012

(30) Foreign Application Priority Data

Aug. 23, 2010  (JP) ................. 2010-186199

(51) Int. Cl.
　　G06F 3/041　　(2006.01)
　　G06F 3/044　　(2006.01)
　　G09G 3/36　　(2006.01)

(52) U.S. Cl.
　　CPC ............. *G06F 3/0412* (2013.01); *G06F 3/044* (2013.01); *G06F 3/0416* (2013.01); *G09G 3/3655* (2013.01); *G09G 3/3677* (2013.01); *G06F 2203/04101* (2013.01); *G09G 2354/00* (2013.01)
　　USPC ...................................... 345/173; 178/18.01

(58) Field of Classification Search
　　USPC ........ 345/173–178; 178/18.01–20.04; 349/12
　　See application file for complete search history.

(56) References Cited

U.S. PATENT DOCUMENTS

2008/0062140 A1\* 3/2008 Hotelling et al. ............. 345/173
2008/0218648 A1 　9/2008 Koshihara et al.

(Continued)

FOREIGN PATENT DOCUMENTS

JP　　09-120334　　5/1997
JP　　2008-216725 A　　9/2008

(Continued)

OTHER PUBLICATIONS

Japanese Office Action issued Nov. 12, 2013 for corresponding Japanese Application No. 2010-186199.

(Continued)

*Primary Examiner* — Quan-Zhen Wang
*Assistant Examiner* — Chad Dicke
(74) *Attorney, Agent, or Firm* — Rader, Fishman & Grauer PLLC

(57) ABSTRACT

A display device with a touch detection function includes a plurality of common drive electrodes arranged side by side to extend in one direction, a display element performing display, based on a pixel signal and a display drive signal, a touch detection element of electrostatic capacitance type detecting an external proximity object based on a touch detection drive signal with an amplitude larger than that of the display drive signal, and a scan drive section performing first scan drive and second scan drive, the first scan drive allowing the plurality of common drive electrodes to be sequentially supplied with the display drive signal in a time-divisional manner, and the second scan drive allowing the plurality of common drive electrodes to be sequentially supplied with the touch detection drive signal in a time-divisional manner.

8 Claims, 15 Drawing Sheets

(56) References Cited

U.S. PATENT DOCUMENTS

| | | | |
|---|---|---|---|
| 2009/0256818 A1* | 10/2009 | Noguchi et al. | 345/174 |
| 2010/0066692 A1 | 3/2010 | Noguchi et al. | |
| 2010/0085324 A1 | 4/2010 | Noguchi et al. | |
| 2010/0194698 A1* | 8/2010 | Hotelling et al. | 345/173 |
| 2011/0043483 A1 | 2/2011 | Mizuhashi et al. | |
| 2011/0267295 A1* | 11/2011 | Noguchi et al. | 345/173 |
| 2012/0044166 A1* | 2/2012 | Mizuhashi et al. | 345/173 |
| 2012/0044167 A1* | 2/2012 | Nakanishi et al. | 345/173 |
| 2013/0141377 A1 | 6/2013 | Noguchi et al. | |
| 2013/0141379 A1 | 6/2013 | Noguchi et al. | |
| 2013/0147746 A1 | 6/2013 | Noguchi et al. | |

FOREIGN PATENT DOCUMENTS

| | | |
|---|---|---|
| JP | 2009-258182 | 11/2009 |
| JP | 2010-072743 A | 4/2010 |
| JP | 2010-092275 A | 4/2010 |
| TW | 338825 A | 8/1998 |
| TW | 201027404 A | 7/2010 |
| TW | 201037648 A | 10/2010 |
| WO | WO-2010/023834 A1 | 3/2010 |

OTHER PUBLICATIONS

Taiwanese Office Action issued Jul. 24, 2014 for corresponding Taiwanese Application No. 100125686.

* cited by examiner

| Sd(n) | St(n) | Seld | Seldc | Selt |
|---|---|---|---|---|
| 0 | 0 | 0 | 1 | 0 |
| 0 | 1 | 0 | 0 | 1 |
| 1 | 0 | 1 | 0 | 0 |
| 1 | 1 | 1 | 0 | 0 |

DISPLAY DEVICE WITH TOUCH DETECTION FUNCTION, DRIVE CIRCUIT, DRIVING METHOD OF DISPLAY DEVICE WITH TOUCH DETECTION FUNCTION, AND ELECTRONIC UNIT

BACKGROUND

This disclosure relates to a display device capable of a detecting an external proximity object, and in particular, to a display device with a touch detection function detecting touch events based on a change of an electrostatic capacitance, a drive circuit, a driving method of a display device with a touch detection function, and an electronic unit including the display device, the drive circuit, and the driving method.

In recent years, a display device capable of inputting information by mounting a touch detection function detecting an external proximity object such as a finger, on a display device such as a liquid crystal display device, and displaying various button images on the display device instead of typical mechanical buttons has attracted attention. The display device including such a touch detection function does not require input devices such as a keyboard, a mouse, and a keypad, and therefore there is a tendency to expand the use of such a display device to portable information terminals such as a mobile phone, in addition to a computer.

Some methods are included in the touch detection method, and one of them is an electrostatic capacitance method. For example, in Japanese Unexamined Patent Application Publication No. 2009-258182, a display device in which a common electrode which is for display and is originally arranged in the display device is also used as one electrode of a pair of touch sensor electrodes, and the other electrode (touch detection electrode) is arranged to intersect with the common electrode has been proposed. An electrostatic capacitance is formed between the common electrode and the touch detection electrode, and the electrostatic capacitance is changed in response to an external proximity object. The display device uses the change of the electrostatic capacitance to analyze a touch detection signal which appears in the touch detection electrode in response to application of a touch detection drive signal to the common electrode, thereby detecting the external proximity object. In the display device, display operation is performed by sequentially applying the drive signal to the common electrode to perform line-sequential scanning, and the touch detection signal which appears in the touch detection electrode is analyzed according to the drive signal to perform touch detection operation.

SUMMARY

As one of the important characteristics in the touch detection, touch detection sensitivity characteristic is cited. However, since the display device disclosed in Japanese Unexamined Patent Application Publication No. 2009-258182 uses the drive signal for display operation and for touch detection operation, there is possibility of the display operation being affected in a case where the waveform of the drive signal is devised to improve the touch detection property.

It is desirable to provide a display device with a touch detection function capable of improving touch detection sensitivity while suppressing influence to display operation, a drive circuit, a driving method of a display device with a touch detection function, and an electronic unit.

A display device with a touch detection function according to an embodiment of the disclosure includes a plurality of common drive electrodes, a display element, a touch detection element, and a scan drive section. The plurality of common drive electrodes are arranged side by side to extend in one direction. The display element performs display, based on a pixel signal and a display drive signal. The touch detection element is of an electrostatic capacitance type detecting an external proximity object based on a touch detection drive signal with an amplitude larger than that of the display drive signal. The scan drive section performs first scan drive and second scan drive, the first scan drive allowing the plurality of common drive electrodes to be sequentially supplied with the display drive signal in a time-divisional manner, and the second scan drive allowing the plurality of common drive electrodes to be sequentially supplied with the touch detection drive signal in a time-divisional manner.

A drive circuit according to an embodiment of the disclosure includes a scan drive section. The scan drive section performs first scan drive and second scan drive, the first scan drive allowing a plurality of common drive electrodes to be sequentially supplied with a display drive signal in a time-divisional manner, and the second scan drive allowing the plurality of common drive electrodes to be sequentially supplied with a touch detection drive signal with an amplitude larger than that of the display drive signal in a time-divisional manner, on a display section with a touch detection function. The display section includes the plurality of common drive electrodes arranged side by side to extend in one direction, a display element performing display based on a pixel signal and the display drive signal, and a touch detection element of electrostatic capacitance type detecting an external proximity object based on the touch detection drive signal.

A driving method of a display device with a touch detection function according to an embodiment of the disclosure performs first scan drive operation and second scan drive operation, the first scan drive operation for performing display based on a pixel signal and a display drive signal by allowing a plurality of common drive electrodes to be sequentially supplied with a display drive signal in a time-divisional manner, and allowing pixel electrodes, corresponding to the common drive electrodes which are under the supply of the display drive signal, to be sequentially supplied with the pixel signal in synchronization with the supply of the display drive signal, the plurality of common drive electrodes being arranged side by side to extend in one direction, and the second scan drive operation for detecting an external proximity object, based on a detection signal from a touch detection electrode, by allowing the plurality of common drive electrodes to be sequentially supplied with a touch detection drive signal with an amplitude larger than that of the display drive signal in a time-divisional manner, the touch detection electrode forming an electrostatic capacitance with the plurality of common drive electrodes.

An electronic unit according to an embodiment of the disclosure includes the above-described display device with a touch detection function, and corresponds to, for example, a television, a digital camera, a personal computer, a video camera, and a portable terminal device such as a mobile phone.

In the display device with a touch detection function, the drive circuit, the driving method of a display device with a touch detection function, and the electronic unit according to the embodiment of the disclosure, the display drive signal is sequentially applied to the common drive electrodes in the first scan drive during the display operation, and the touch detection drive signal with an amplitude larger than that of the display drive signal is sequentially applied to the common drive electrodes in the second scan drive during the touch detection operation. In the touch detection operation, the signal with an amplitude depending on the amplitude of the touch detection drive signal is output from the touch detection element as a detection signal.

In the display device with a touch detection function according to the embodiment of the disclosure, for example, when the common drive electrode selected as a target of the first scan drive is coincident with the common drive electrode selected as the second scan drive, the scan drive section desirably applies the display drive signal to the coincident common drive electrode. In addition, the scan drive section includes, for example, a first switch transmitting the display drive signal and a second switch transmitting the touch detection drive signal, allows the first switch to be turned on during the first scan drive to apply the display drive signal to the common drive electrode, and allows the second switch to be turned on during the second scan drive to apply the touch detection drive signal to the common drive electrode. The scan drive section further includes, for example, a third switch transmitting a direct-current potential, and the scan drive section may allow the third switch to be turned on to apply the direct-current potential to the common drive electrode which is not selected as a target of the first and second scan drive. The direct-current potential is desirably, for example, equal to a time-averaged voltage value of the display drive signal. The waveform of the touch detection drive signal may be a rectangular wave signal with alternately-inverted polarity, for example.

In the display device with a touch detection function, the drive circuit, the driving method of a display device with a touch detection function, and the electronic unit according to the embodiment of the disclosure, different drive signals are used in the first scan drive and in the second scan drive, and the touch detection drive signal with the amplitude larger than that of the display drive signal used in the first scan drive is used in the second scan drive. Therefore, the touch detection sensitivity may be improved while suppressing influence to the display operation.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, preferred embodiments of the disclosure will be described in detail with reference to drawings. Note that the description will be given in the following order.

1. Basic principle of electrostatic capacitance type touch detection
2. Embodiment
3. Application examples 1. Basic Principle of Electrostatic Capacitance Type Touch Detection First, a basic principle of touch detection in a display device with a touch detection function of the disclosure will be described with reference to FIG. 1 to FIG. 3. The touch detection method is implemented as a touch sensor of electrostatic capacitance type, and a capacitance element is configured with use of a pair of electrodes (a drive electrode E1 and a touch detection electrode E2) facing to each other with a dielectric body D in between as illustrated in (A) of FIG. 1.

Figure 1:
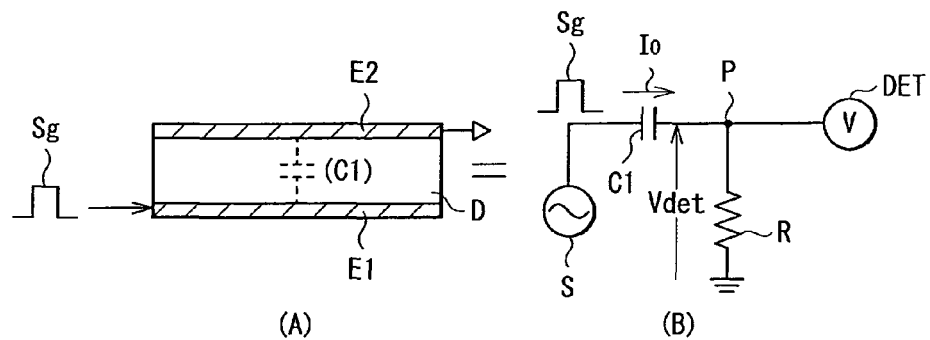
FIG. 1 is a diagram for describing a basic principle of a touch detection method in a display device with a touch detection function according to the disclosure, and a diagram illustrating a state where a finger is not in contact with or not in proximity to the display device.

The configuration is represented as an equivalent circuit illustrated in (B) of FIG. 1. A capacitance element C1 is configured of the drive electrode E1, the touch detection electrode E2, and the dielectric body D. One end of the capacitance element C1 is connected to an alternating signal source (a drive signal source) S, and the other end P is grounded through a resistor R and is connected to a voltage detector (a touch detection circuit) DET. When an alternating rectangular wave Sg ((B) of FIG. 3) with a predetermined frequency (for example, several kHz to several tens kHz) is applied to the drive electrode E1 (one end of the capacitance element C1) from the alternating signal source S, an output waveform (a touch detection signal Vdet) illustrated in (A) of FIG. 3 appears in the touch detection electrode E2 (the other end P of the capacitance element C1). Note that the alternating rectangular wave Sg corresponds to a touch detection drive signal Vcomt described later.

In a state where a finger is not in contact with (or not in proximity to) the display device, as illustrated in FIG. 1, a current I0 according to the capacitance value of the capacitance element C1 flows in response to charge and discharge with respect to the capacitance element C1. The other end P of the capacitance element C1 at this time has a potential waveform like a waveform V0 in (A) of FIG. 3, and is detected by the voltage detector DET.

Figure 2:
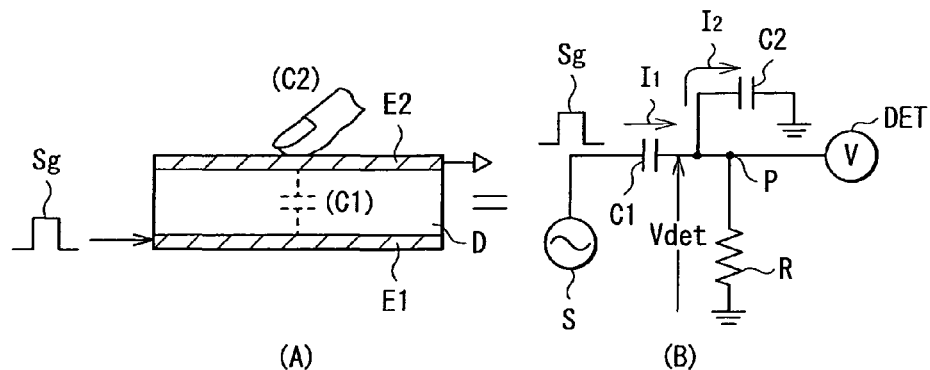
FIG. 2 is a diagram for describing the basic principle of the touch detection method in the display device with a touch detection function according to the disclosure, and a diagram illustrating a state where a finger is in contact with or in proximity to the display device.
Figure 3:
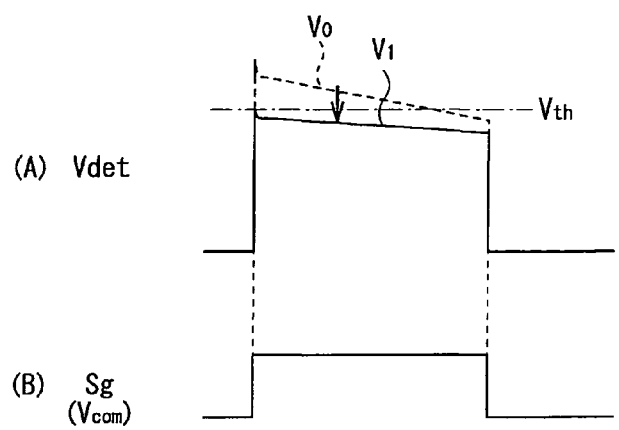
FIG. 3 is a diagram for describing the basic principle of the touch detection method in the display device with a touch detection function according to the disclosure, and a diagram illustrating an example of a waveform of a drive signal and a touch detection signal.

On the other hand, in a state where a finger is in contact with (or in proximity to) the display device, as illustrated in FIG. 2, a capacitance element C2 formed by the finger is added in series with the capacitance element C1. In this state, currents I1 and I2 flow in response to charge and discharge with respect to the capacitance elements C1 and C2, respectively. The other end P of the capacitance element C1 has a potential waveform like a waveform V1 in (A) of FIG. 3, and is detected by the voltage detector DET. At this time, the potential of the point P is a partial potential determined by values of the currents I1 and I2 flowing through the capacitance elements C1 and C2. Therefore, the waveform V1 is a smaller value than that of the waveform V0 in a non-contact state. The voltage detector DET compares the detected voltage with a predetermined threshold voltage Vth to determine the non-contact state when the detected voltage is equal to or larger than the threshold voltage, and to determine a contact state when the detected voltage is smaller than the threshold voltage. In such a way, touch detection is achievable.

2. Embodiment

Configuration Example

General Configuration Example

Figure 4:
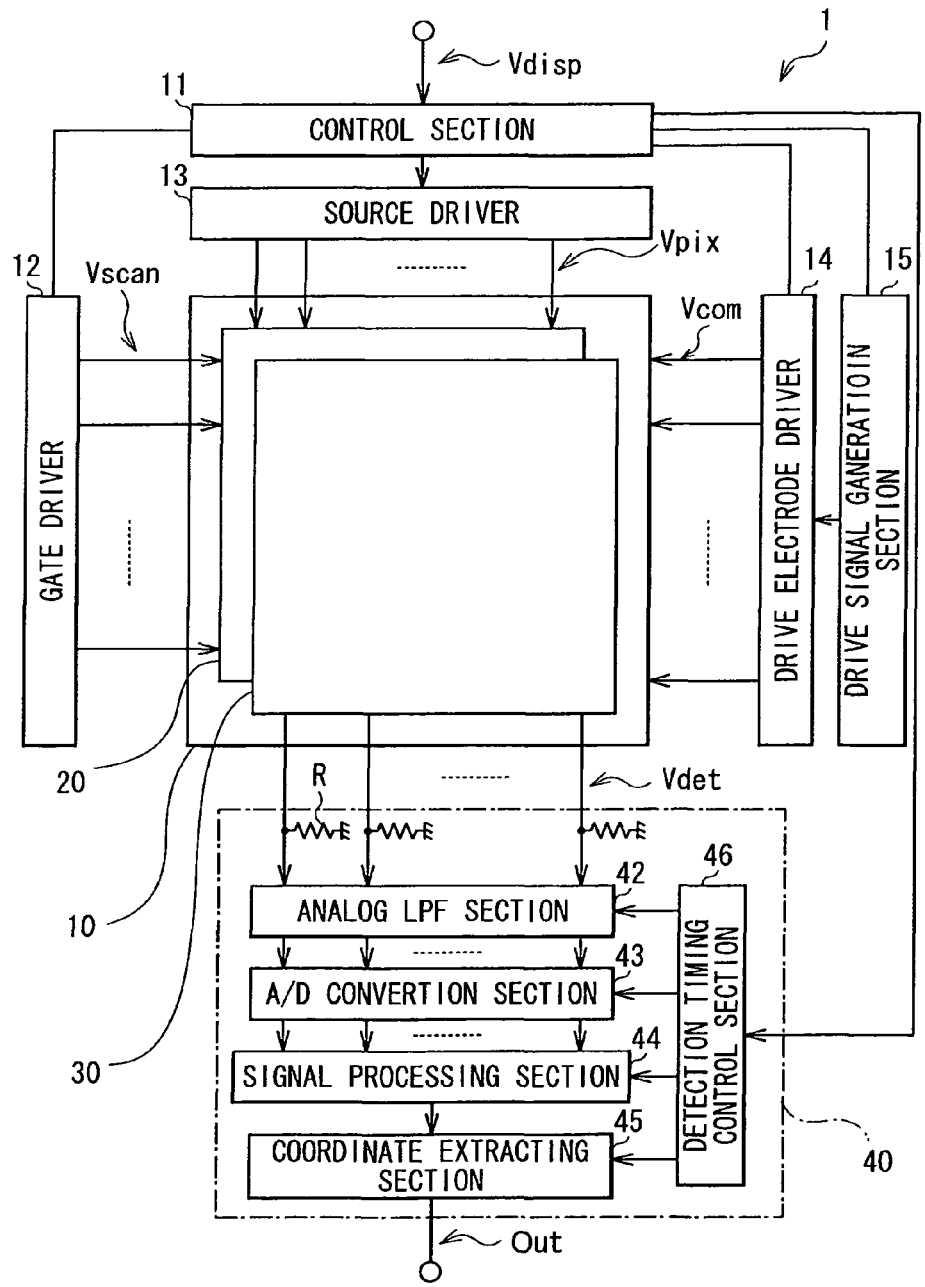
FIG. 4 is a block diagram illustrating a configuration example of a display device with a touch detection function according to an embodiment of the disclosure.

FIG. 4 illustrates a configuration example of a display device with a touch detection function according to an embodiment of the disclosure. Incidentally, a drive circuit and a driving method of a display device with a touch detection function according to an embodiment of the disclosure are implemented by this embodiment, so the description thereof will be given together. The display device with a touch detection function uses a liquid crystal display element as a display element, and is of a so-called in-cell type in which a liquid crystal display section configured of the liquid crystal display element and an electrostatic capacitance type touch detection section are integrated.

A display device with a touch detection function 1 includes a control section 11, a gate driver 12, a source driver 13, a drive signal generation section 15, a drive electrode driver 14, a display section with a touch detection function 10, and a touch detection circuit 40.

The control section 11 supplies a control signal to the gate driver 12, the source driver 13, the drive signal generation section 15, the drive electrode driver 14, and the touch detection circuit 40 based on a picture signal Vdisp supplied from outside, and controls these parts to operate in synchronization with one another.

The gate driver 12 has a function to sequentially select one horizontal line which is a target of display drive of the display section with a touch detection function 10, based on the control signal supplied from the control section 11. Specifically, as will be described later, the gate driver 12 applies a scan signal Vscan to a gate of a TFT element Tr of a pixel Pix through a scan signal line GCL to sequentially select, as a target of display drive, one row (one horizontal line) in the pixels Pix formed in a matrix in a liquid crystal display section 20 of the display section with a touch detection function 10.

The source driver 13 supplies a pixel signal Vpix to each pixel Pix (described later) in the display section with a touch detection function 10 based on the control signal supplied from the control section 11. Specifically, the source driver 13 supplies the pixel signal Vpix to each pixel Pix configuring one horizontal line sequentially selected by the gate driver 12 through a pixel signal line SGL as will be described later.

The drive signal generation section 15 generates a drive signal Vcom based on the control signal supplied from the control section 11. Specifically, as will be described later, the drive signal generation section 15 generates a display drive signal Vcomd for display operation and a touch detection drive signal Vcomt for the touch detection operation, and supplies these signals to the drive electrode driver 14 described later.

The drive electrode driver 14 supplies the drive signal Vcom supplied from the drive signal generation section 15 to drive electrodes COML (described later) of the display section with a touch detection function 10 based on the control signal supplied from the control section 11. Specifically, the drive electrode driver 14 has a function to sequentially apply the display drive signal Vcomd and the touch detection drive signal Vcomt to the drive electrodes COML in a time-divisional manner.

The gate driver 13 and the drive electrode driver 14 configure a scan drive section 50. The configuration of the scan drive section 50 will be described in detail later.

The display section with a touch detection function 10 is a display section incorporating a touch detection function. The display section with a touch detection function 10 includes the liquid crystal display section 20 and a touch detection section 30. The liquid crystal display section 20 is a device performing sequential scanning on one horizontal line basis to perform display according to the scan signal Vscan supplied from the gate driver 12 and the display drive signal Vcomd supplied from the drive electrode driver 14. The touch detection section 30 operates based on the above-described basic principle of the electrostatic capacitance type touch detection, and outputs the touch detection signal Vdet based on the touch detection drive signal Vcomt supplied from the drive electrode driver 14.

The touch detection circuit 40 is a circuit detecting the presence of touch events with respect to the touch detection section 30 based on the control signal supplied from the control section 11 and the touch detection signal Vdet supplied from the touch detection section 30 of the display section with a touch detection function 10, and when the touch event is detected, the touch detection circuit 40 determines the coordinate and the like of the touch event in a touch detection region. The touch detection circuit 40 includes an analog LPF (low pass filter) section 42, an A/D conversion section 43, a signal processing section 44, a coordinate extracting section 45, and a detection timing control section 46. The analog LPF section 42 is a low-pass analog filter which removes high-frequency content (noise content) contained in the touch detection signal Vdet supplied from the touch detection section 30 to extract and output touch content. A resistor R for applying a direct-current potential (0V) is connected between an input terminal of the analog LPF section 42 and the ground. Incidentally, by providing a switch instead of the resistor R and turning the switch on at a predetermined time, the direct-current potential (0V) may be provided. The A/D conversion section 43 is a circuit converting an analog signal output from the analog LPF section 42 into a digital signal. The signal processing section 44 is a logic circuit detecting the presence of touch events with respect to the touch detection section 30 based on the output signal of the A/D conversion section 43. The coordinate extracting section 45 is a logic circuit determining a touch panel coordinate when the touch event is detected by the signal processing section 44. The detection timing control section 46 controls these circuits to operate in synchronization with one another.

(Display Section with Touch Detection Function 10)

Next, the configuration example of the display section with a touch detection function 10 will be described in detail.

Figure 5:
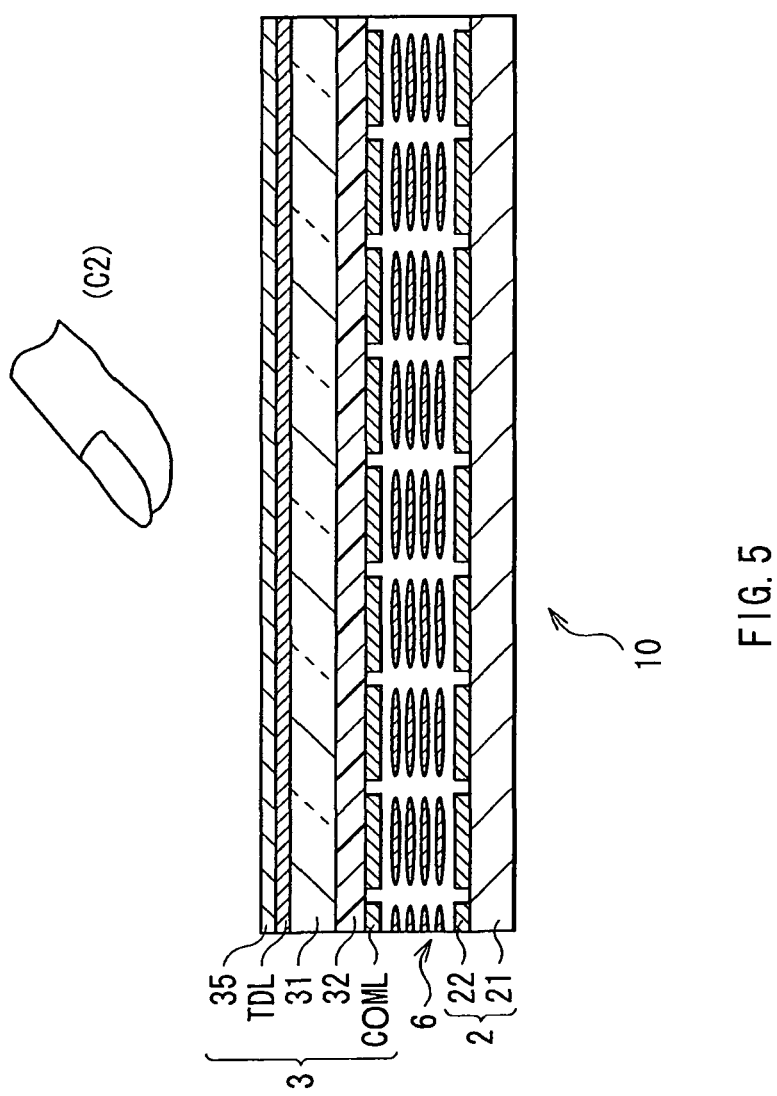
FIG. 5 is a sectional view illustrating a schematic cross-sectional configuration of a display section with a touch detection function according to the embodiment.

FIG. 5 illustrates an example of a cross-sectional configuration of a relevant part of the display section with a touch detection function 10. The display section with a touch detection function 10 has a pixel substrate 2, a facing substrate 3 disposed to face the pixel substrate 2, and a liquid crystal layer 6 inserted between the pixel substrate 2 and the facing substrate 3.

The pixel substrate 2 includes a TFT substrate 21 as a circuit substrate and a plurality of pixel electrodes 22 arranged in a matrix on the TFT substrate 21. In the TFT substrate 21, although not illustrated, thin film transistors (TFTs) for each pixels, and wirings such as the pixel signal line SGL for supplying the pixel signal Vpix to the pixel electrodes 22 and the scan signal line GCL for driving TFTs are formed.

The facing substrate 3 includes a glass substrate 31, a color filter 32 formed on a surface of the glass substrate 31, and a plurality of drive electrodes COML formed on the color filter 32. The color filter 32 is configured by cyclically arranging three color filter layers of red (R), green (G), and blue (B), for example, and a set of three colors of R, G, and B corresponds to each display pixel. The drive electrodes COML function as common drive electrodes for the liquid crystal display section 20, and function as drive electrodes for the touch detection section 30. The drive electrodes COML are connected to the pixel substrate 2 through a contact conducting cylinder (not illustrated), and the drive signal Vcom (the display drive signal Vcomd and the touch detection drive signal Vcomt) with the alternating rectangular waveform is applied from the pixel substrate 2 to the drive electrodes COML through the contact conducting cylinder. On the other surface of the glass substrate 31, the touch detection electrodes TDL are formed as detection electrodes of the touch detection section 30, and a polarizing plate 35 is disposed on the touch detection electrodes TDL.

The liquid crystal layer 6 modulates light passing therethrough according to a state of electric field, and liquid crystal of various modes such as TN (twisted nematic), VA (vertical alignment), and ECB (electrically controlled birefringence) is used.

Incidentally, an alignment film is disposed between the liquid crystal layer 6 and the pixel substrate 2, and between the liquid crystal layer 6 and the facing substrate 3. In addition, an incident-side polarizing plate is disposed on a bottom surface side of the pixel substrate 2, which is not illustrated in the figure.

Figure 6:
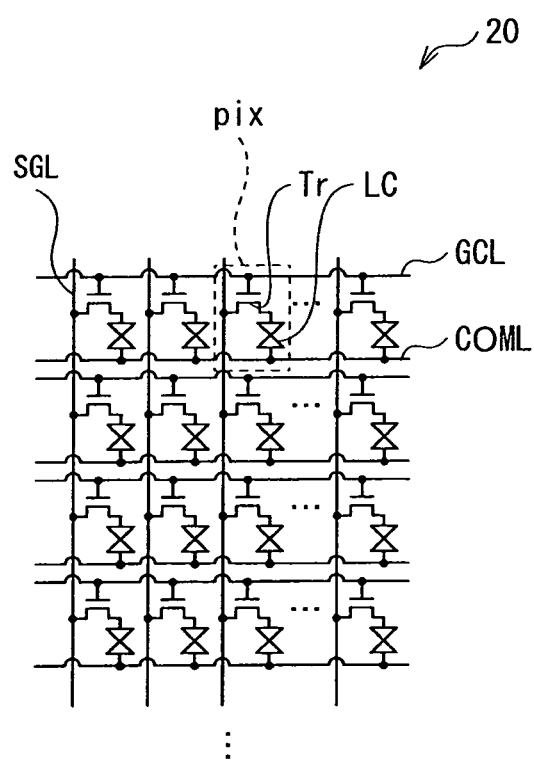
FIG. 6 is a circuit diagram illustrating a pixel arrangement of the display section with a touch detection function according to the embodiment.

FIG. 6 illustrates a configuration example of a pixel configuration in the liquid crystal display section 20. The liquid crystal display section 20 has the plurality of pixels Pix arranged in a matrix. Each of the pixels Pix has a TFT element Tr and a liquid crystal element LC. The TFT element Tr is configured of a thin film transistor, and in this example, the TFT element Tr is configured of an n-channel MOS (metal oxide semiconductor) TFT. A source of the TFT element Tr is connected to the pixel signal line SGL, a gate thereof is connected to the scan signal line GCL, and a drain thereof is connected to one end of the liquid crystal element LC. One end of the liquid crystal element LC is connected to the drain of the TFT element Tr, and the other end thereof is connected to the drive electrode COML.

Each of the pixels Pix is connected, through the scan signal line GCL, to the other pixels Pix which are in the same row of the liquid crystal display section 20. The scan signal line GCL is connected to the gate driver 12, and the scan signal Vscan is supplied from the gate driver 12. In addition, each of the pixels Pix is connected, through the pixel signal line SGL, to the other pixels Pix which are in the same column of the liquid crystal display section 20. The pixel signal line SGL is connected to the source driver 13, and the pixel signal Vpix is supplied from the source driver 13.

Moreover, each of the pixels Pix is connected, through the drive electrode COML, to the other pixels Pix which are in the same row of the liquid crystal display section 20. The drive electrodes COML are connected to the drive electrode driver 14, and the drive signal Vcom is supplied from the drive electrode driver 14.

With this configuration, in the liquid crystal display section 20, the gate driver 12 drives the scan signal line GCL to perform line-sequential scanning in a time-divisional manner so that one horizontal line is sequentially selected. Then, the source driver 13 supplies the pixel signal Vpix to the pixels Pix in the selected one horizontal line to perform display on one horizontal line basis. When the display operation is performed, the drive electrode driver 14 applies the display drive signal Vcomd to the drive electrode COML corresponding to the one horizontal line.

Figure 7:
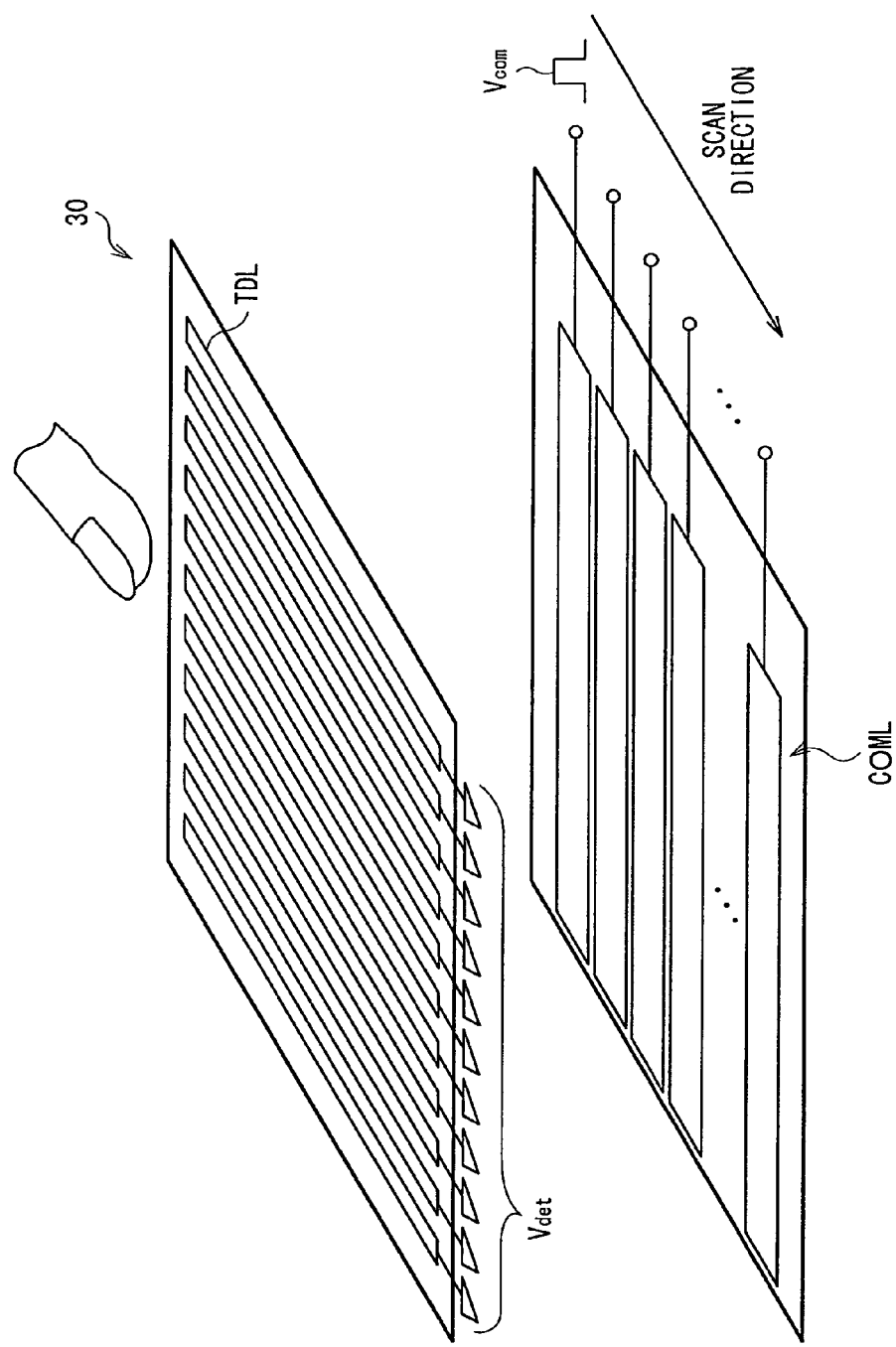
FIG. 7 is a perspective view illustrating a configuration example of drive electrodes and touch detection electrodes of the display section with a touch detection function according to the embodiment.

FIG. 7 is a perspective view illustrating a configuration example of the touch detection section 30. The touch detection section 30 is configured of the drive electrodes COML and the touch detection electrodes TDL arranged in the facing substrate 3. Each of the drive electrodes COML is configured of a stripe-shaped electrode pattern extending in a lateral direction of the figure. When the touch detection operation is performed, in the each electrode pattern, the touch detection drive signal Vcomt is sequentially supplied by the drive electrode driver 14 to perform scan drive. Each of the touch detection electrodes TDL is configured of a stripe-shaped electrode pattern extending in a direction orthogonal to an extending direction of the electrode pattern of the drive electrode COML. The electrode pattern of each of the touch detection electrodes TDL is connected to each input of the analog LPF section 42 of the touch detection circuit 40. The electrode patterns of the drive electrodes COML and the electrode patterns of the touch detection electrodes TDL intersecting with each other form an electrostatic capacitance at each intersection.

With this configuration, in the touch detection section 30, when the touch detection operation is performed, the drive electrode driver 14 drives the drive electrodes COML to be line-sequentially scanned in the time-divisional manner and outputs the touch detection signal Vdet from the touch detection electrode TDL, thereby performing the touch detection. In other words, the drive electrodes COML correspond to the drive electrode E1 in the basic principle of the touch detection illustrated in FIGS. 1 to 3, and the touch detection electrodes TDL correspond to the touch detection electrode E2. The touch detection section 30 detects touch events in accordance with the basic principle. As illustrated in FIG. 7, the electrode patterns intersecting with each other configure a touch sensor of electrostatic capacitance type in a matrix. Therefore, scanning is performed over the touch detection surface of the touch detection section 30 so that a contact position or a proximal position of the external proximity object is detectable.

(Scan Drive Section 50)

Next, the configuration example of the scan drive section 50 configured of the gate driver 12 and the drive electrode driver 14 will be described in detail.

Figure 8:
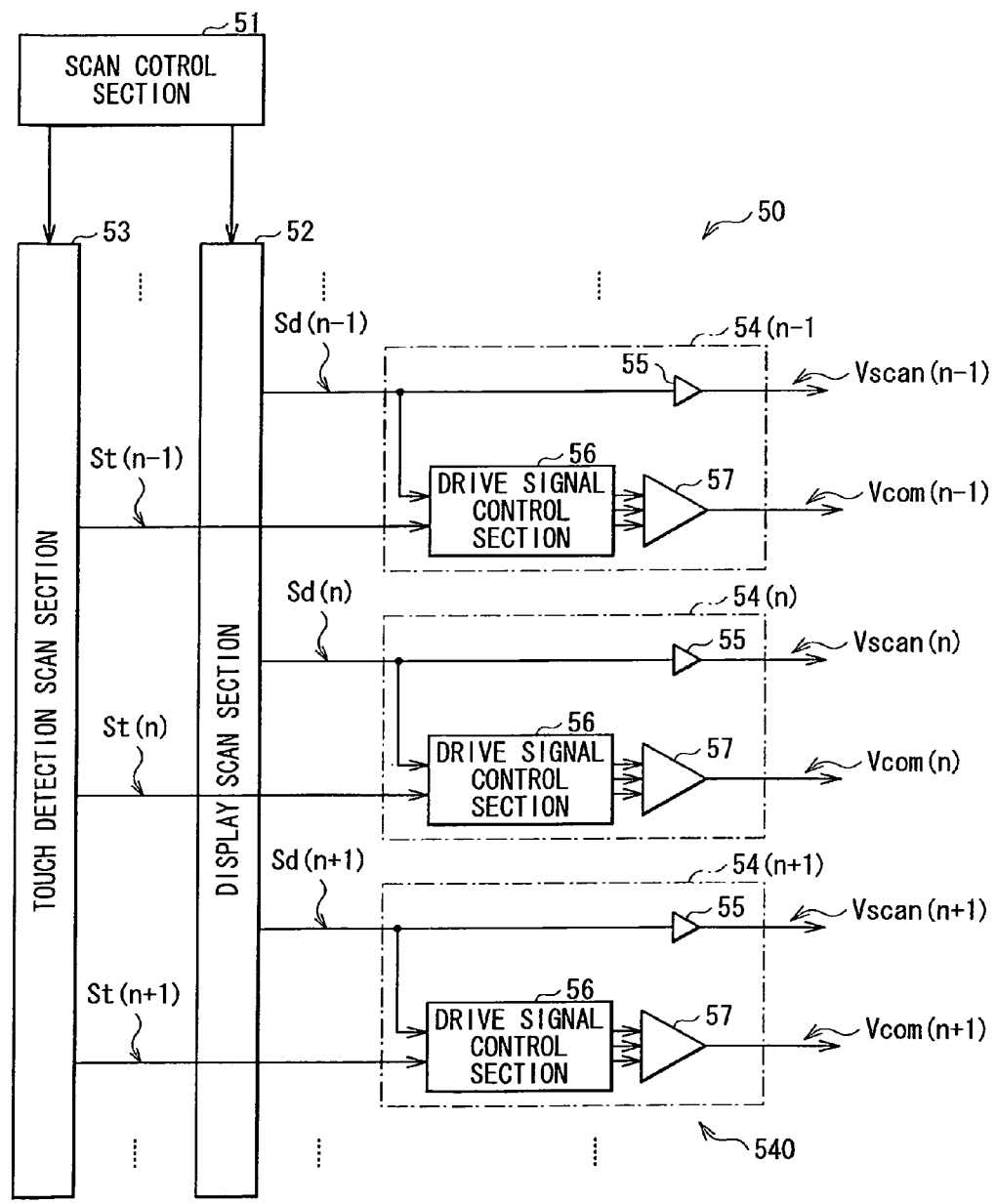
FIG. 8 is a block diagram illustrating a configuration example of a scan drive section according to the embodiment.

FIG. 8 illustrates a configuration example of the scan drive section 50. The scan drive section 50 includes a scan control section 51, a display scan section 52, a touch detection scan section 53, and a drive section 540. The display scan section 52, the scan control section 51, and a part of the drive section 540 configure the gate driver 12. In addition, the touch detection scan section 53, the scan control section 51, and a part of the drive section 540 configure the drive electrode driver 14. The drive section 540 includes N pieces of drive sections 54(1) to 54(N). Hereinafter, arbitrary one of the N pieces of drive sections 54(1) to 54(N) is simply referred to as the drive section 54.

The scan control section 51 supplies the control signal to the display scan section 52 and the touch detection scan section 53 based on the control signal (not illustrated) supplied from the control section 11.

The display scan section 52 includes a shift register, and generates a signal Sd for selecting the scan signal line GCL which sequentially applies the scan signal Vscan. In addition, the signal Sd is also used for selecting the drive electrode COML which sequentially applies the display drive signal Vcomd. Specifically, the display scan section 52 generates a plurality of signals Sd which respectively corresponds to the scan signal lines GCL. When the display scan section 52 outputs a high-level signal as the n-th signal Sd(n), the corresponding n-th drive section 54(n) applies the scan signal Vscan(n) to the n-th scan signal line GCL, and applies the display drive signal Vcomd to the n-th drive electrode COML (n). In other words, the display scan section 52 outputs the high-level signal Sd to instruct the drive section 540 to perform display drive.

The touch detection scan section 53 includes a shift register, and generates a signal St for selecting the drive electrode COML which sequentially applies the touch detection drive signal Vcomt. Specifically, the touch detection scan section 53 generates a plurality of signals St which respectively corresponds to the drive electrodes COML. When the touch detection scan section 53 outputs a high-level signal as the n-th signal St(n), the corresponding n-th drive section 54(n) applies the touch detection drive signal Vcomt to the n-th drive electrode COML(n). In other words, the touch detection scan section 53 outputs the high-level signal St to instruct the drive section 540 to perform touch detection drive.

The drive section 540 applies the scan signal Vscan to the scan signal line GCL and applies the drive signal Vcom to the drive electrodes COML based on the signal Sd supplied from the display scan section 52 and the signal St supplied from the touch detection scan section 53. The drive section 54 is provided one by one to correspond to a set of the output signals of the display scan section 51 and the touch detection scan section 52. The drive section 54 applies the scan signal Vscan to the corresponding scan signal line GCL and applies the drive signal Vcom to the corresponding drive electrode COML. Each of the drive sections 54 includes a gate buffer 55, a drive signal control circuit 56, and a drive signal buffer 57.

The gate buffer 55 is a circuit applying the scan signal Vscan to the scan signal line GCL based on the signal Sd supplied from the display scan section 52. Specifically, the gate buffer 55 has a function to amplify the signal Sd to an oscillation level which may control the TFT element Tr of the liquid crystal display section 20 to be turned ON or OFF.

The drive signal control circuit 56 has a function to control application of the drive signal Vcom with respect to the drive electrodes COML based on the signal Sd supplied from the display scan section 52 and the signal St supplied from the touch detection scan section 53. The drive signal buffer 57 is a circuit applying the drive signal Vcom to the drive electrodes COML based on the signal supplied from the drive signal control circuit 56.

Figure 9:
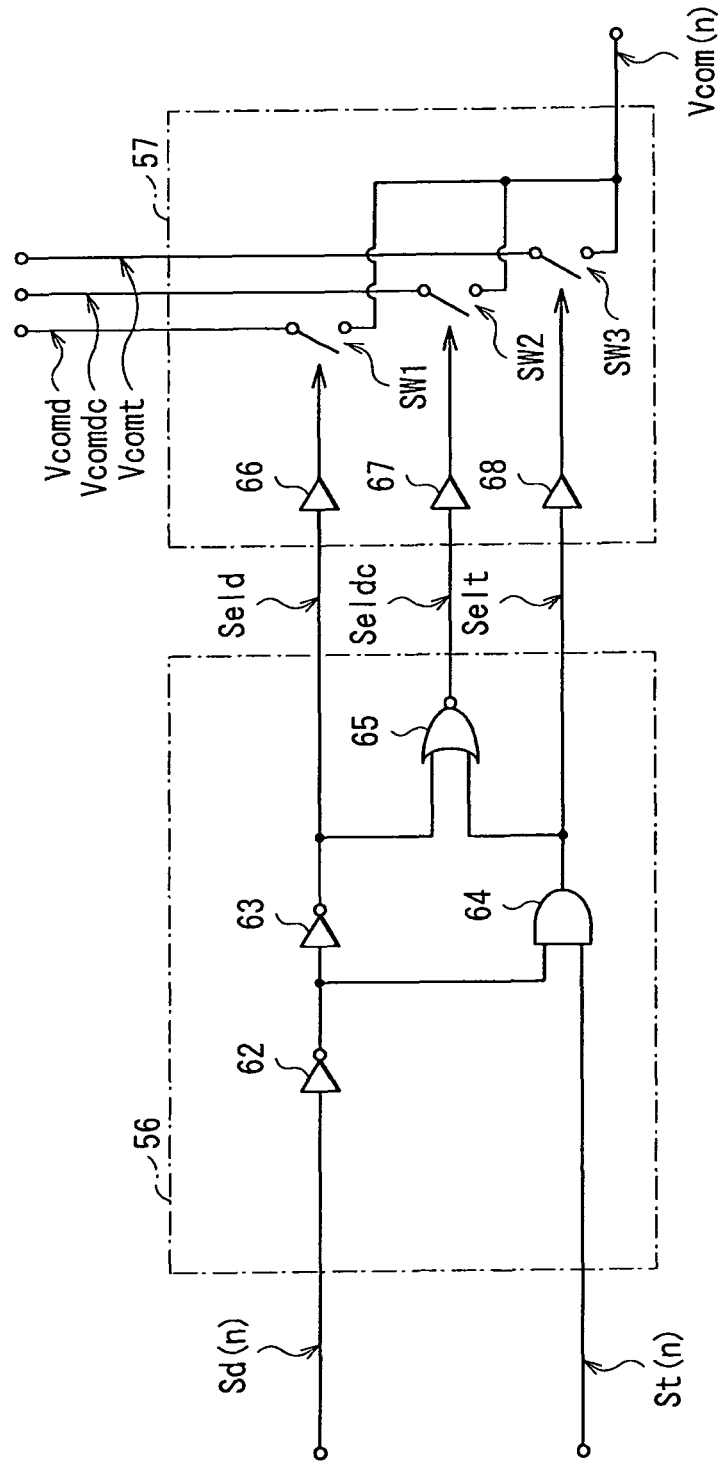
FIG. 9 is a circuit diagram illustrating a configuration example of a drive signal control circuit and a drive signal buffer according to the embodiment.

FIG. 9 illustrates a configuration example of the drive signal control circuit 56 and the drive signal buffer 57.

The drive signal control circuit 56 includes inverters 62 and 63, an AND circuit 64, and a NOR circuit 65. The inverter 62 generates and outputs an inversion logic of the input signal Sd(n), and the inverter 63 generates an inversion logic of the output signal of the inverter 62 to output the inversion logic as a signal Seld. The AND circuit 64 generates a logical product (AND) between the signal St(n) and the output signal of the inverter 62 to output the logical product as a signal Selt. The NOR circuit 65 generates an inverted logical sum (NOR) between the output signal Seld of the inverter 63 and the output signal Selt of the AND circuit 64 to output the inverted logical sum as a signal Seldc.

Figures 10, 11:
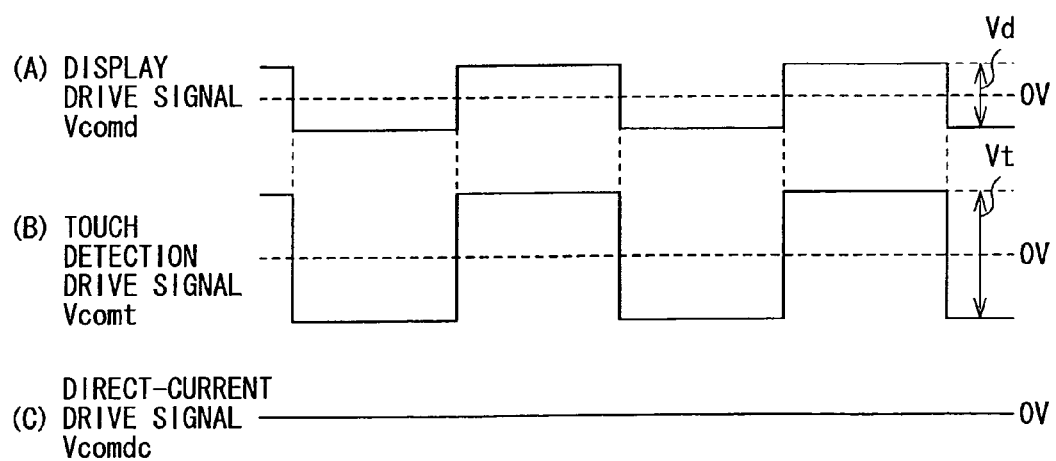
FIG. 10 is a truth table illustrating an operation example of the drive signal control circuit according to the embodiment.
FIG. 11 is a waveform chart illustrating an example of a display drive signal, a touch detection drive signal, and a direct-current drive signal according to the embodiment.

FIG. 10 is a truth table of the drive signal control circuit 56. The truth table illustrates logic of the output signals Seld, Seldc, and Selt when the signals Sd(n) and St(n) are input.

In the drive signal control circuit 56, as illustrated in FIG. 10, when the signal Sd(n) is at high level and the signal St(n) is at low level, the output signal Seld is at high level and the output signals Seldc and Selt are at low level. When the signal St(n) is at high level and the signal Sd(n) is at low level, the output signal Selt is at high level and the output signals Seld and Sledc are at low level. When the signals Sd(n) and St(n) are at high level, the output signal Seld is at high level and the output signals Seldc and Selt are at low level. When the signals Sd (n) and St (n) are at low level, the output signal Seldc is at high level and the output signals Seld and Selt are at low level.

The drive signal buffer 57 includes buffers 66 to 68 and switches SW1 to SW3. The buffer 66 has a function to amplify the input signal Seld to an oscillation level which may control the switch SW1 to be turned ON or OFF. The switch SW1 is controlled to be turned ON or OFF based on a signal supplied from the buffer 66. One end of the switch SW1 is supplied with the display drive signal Vcomd, and the other end of the switch SW1 is connected to an output terminal of the drive signal buffer 57. The buffer 67 has a function to amplify the input signal Seldc to an oscillation level which may control the switch SW2 to be turned ON or OFF. The switch SW2 is controlled to be turned ON or OFF based on a signal supplied from the buffer 67. One end of the switch SW2 is supplied with the direct-current drive signal Vcomdc, and the other end of the switch SW2 is connected to the output terminal of the drive signal buffer 57. The buffer 68 has a function to amplify the input signal Selt to an oscillation level which may control the switch SW3 to be turned ON or OFF. The switch SW3 is controlled to be turned ON or OFF based on a signal supplied from the buffer 68. One end of the switch SW3 is supplied with the touch detection drive signal Vcomt, and the other end of the switch SW3 is connected to the output terminal of the drive signal buffer 57.

(A) of FIG. 11 illustrates the display drive signal Vcomd, (B) of FIG. 11 illustrates the touch detection drive signal Vcomt, and (C) of FIG. 11 illustrates a waveform example of the direct-current drive signal Vcomdc. The display drive signal Vcomd is a rectangular wave signal with an amplitude Vd as illustrated in (A) of FIG. 11. In the example illustrated in (B) of FIG. 11, the touch detection drive signal Vcomt is a rectangular wave signal similar to the display drive signal Vcomd, and has an amplitude Vt larger than that of the display drive signal Vcomd. In the example illustrated in (C) of FIG. 11, the direct-current drive signal Vcomdc is a direct-current signal of 0V, and has a potential equal to a time-averaged voltage value of the display drive signal Vcomd and the touch detection drive signal Vcomt.

With this configuration, the drive signal buffer 57 outputs the display drive signal Vcomd as the drive signal Vcom(n) when the input signal Seld is at high level and the input signals Seldc and Selt are at low level. In addition, when the input signal Seldc is at high level and the input signals Seld and Selt are at low level, the drive signal buffer 57 outputs the direct-current drive signal Vcomdc as the drive signal Vcom(n). When the input signal Selt is at high level and the input signals Seld and Seldc are at low level, the drive signal buffer 57 outputs the touch detection drive signal Vcomt as the drive signal Vcom(n).

With the above-described configuration, the drive section 54(n) interprets supply of the high-level signal Sd(n) from the display scan section 52 as an instruction of the display drive, and then applies the display drive signal Vcomd to the drive electrode COML(n). The drive section 54(n) interprets supply of the high-level signal St(n) from the touch detection scan section 53 as an instruction of the touch detection drive, and then applies the touch detection drive signal Vcomt to the corresponding drive electrode COML(n). When the high-level signal Sd(n) from the display scan section 52 and the high-level signal St(n) from the touch detection scan section 53 are supplied, the drive section 54(n) applies the display drive signal Vcomd to the drive electrode COML(n). In other words, when receiving instructions to perform the display drive and the touch detection drive, the drive signal control circuit 56 gives priority to the display drive and interprets the received instructions as an instruction of the display drive. In addition, when the low-level signal Sd(n) from the display scan section 52 and the low-level signal St(n) from the touch detection scan section 53 are supplied, the drive section 54(n) interprets the supply as neither an instruction of the display drive nor an instruction of the touch detection drive, and applies the direct-current drive signal Vcomdc to the drive electrode COML(n).

Figure 12C:
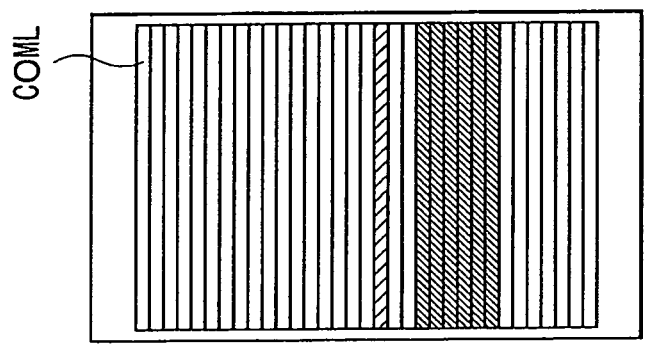
FIGS. 12A to 12C are diagrams illustrating an operation example of the scan drive section according to the embodiment.
Figure 12B:
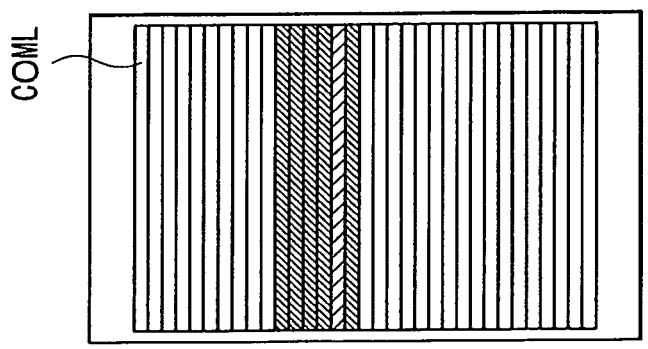
Figure 12A:
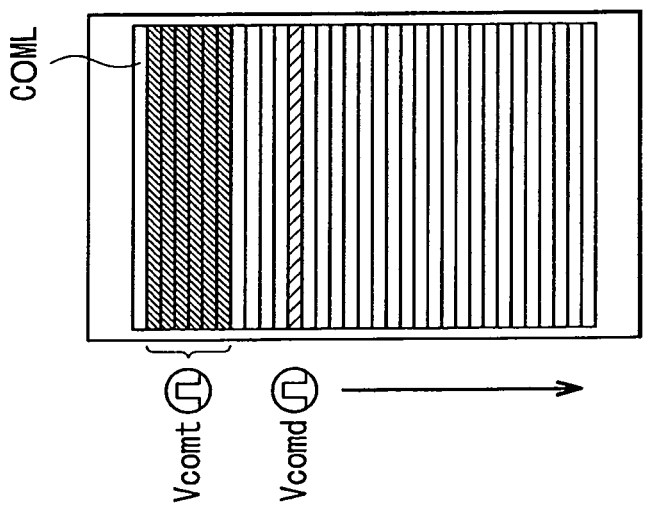

FIGS. 12A to 12C illustrate an operation example of the scan drive section 50. The scan drive section 50 sequentially applies the display drive signal Vcomd and the touch detection drive signal Vcomt to the drive electrodes COML. At this time, in a case where the drive electrode COML to be applied with the display drive signal Vcomd is coincident with the drive electrode COML to be applied with the touch detection drive signal Vcomt (FIG. 12B), by the above-described mechanism for giving priority to the display drive, the coincident drive electrode COML is applied with the display drive signal Vcomd.

In this case, the drive electrodes COML correspond to a specific example of "common drive electrodes" of the disclosure. The liquid crystal element LC corresponds to a specific example of "a display element" of the disclosure. The switches SW1, SW2, and SW3 correspond to a specific example of "a first switch", "a third switch", and "a second switch" of the disclosure, respectively.

[Operations and Functions]

Subsequently, operations and functions of the display device with a touch detection function 1 of the embodiment will be described.

(General Operation Outline)

The control section 11 supplies the control signal to the gate driver 12, the source driver 13, the drive signal generation section 15, the drive electrode driver 14, and the touch detection circuit 40 based on the picture signal Vdisp supplied from outside, and controls these parts to operate in synchronization with one another. The gate driver 12 supplies the scan signal Vscan to the liquid crystal display section 20 to sequentially select one horizontal line to be driven for display. The source driver 13 supplies the pixel signal Vpix to each pixel Pix configuring the horizontal line selected by the gate driver 12. The drive signal generation section 15 generates the display drive signal Vcomd for the display operation and the touch detection drive signal Vcomt for the touch detection operation. The drive electrode driver 14 sequentially applies the display drive signal Vcomd to the drive electrodes COML relate to one horizontal line to be driven for display during the display operation, and during the touch detection operation, sequentially applies the touch detection drive signal Vcomt to the drive electrodes COML related to the touch detection operation. The display device with a touch detection function 10 performs the display operation based on the signals supplied from the gate driver 12, the source driver 13, and the drive electrode driver 14, and performs the touch detection operation based on the touch detection drive signal Vcomt supplied from the drive electrode driver 14 to output the touch detection signal Vdet from the touch detection electrodes TDL. The analog LPF section 42 removes high-frequency content from the touch detection signal Vdet to output the resultant signal. The A/D conversion section 43 converts an analog signal output from the analog LPF section 42 into a digital signal. The signal processing section 44 detects the presence of touch events with respect to the display section with a touch detection function 10 based on the output signal from the A/D conversion section 43. The coordinate extracting section 45 determines a touch panel coordinate when the touch event is detected by the signal processing section 44. The detection timing control section 46 controls the analog LPF section 42, the A/D conversion section 43, the signal processing section 44, and the coordinate extracting section 45 to operate in synchronization with one another.

The detailed operation of the display device with a touch detection function 1 will be described below.

(Display Operation and Touch Detection Operation)

Figure 13:
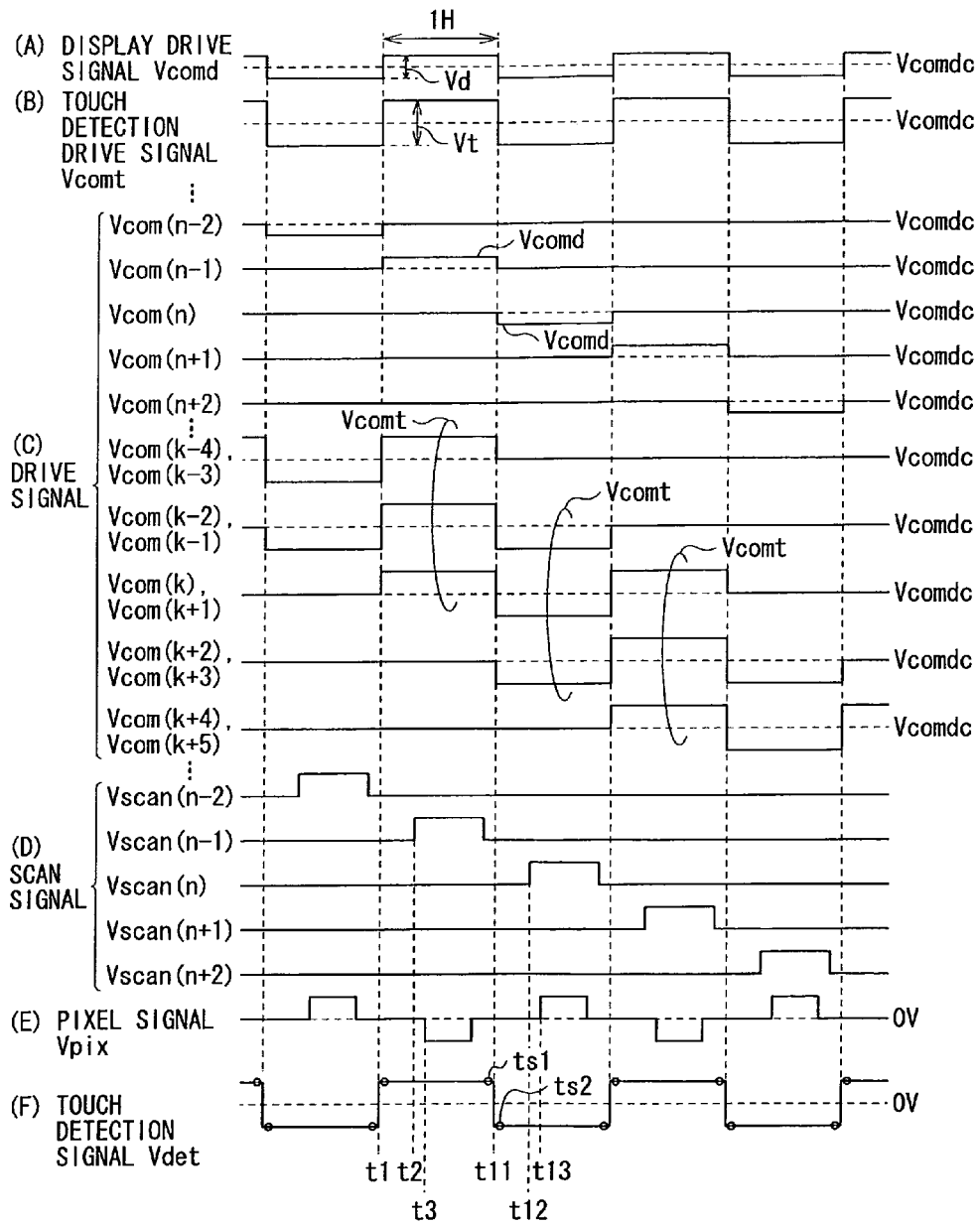
FIG. 13 is a timing waveform chart illustrating an operation example of the display device with a touch detection function according to the embodiment.

FIG. 13 illustrates an example of the display operation and the touch detection operation of the display device with a touch detection function 1, where (A) illustrates a waveform of the display drive signal Vcomd, (B) illustrates a waveform of the touch detection drive signal Vcomt, (C) illustrates waveforms of the drive signal Vcom, (D) illustrates waveforms of the scan signal Vscan, (E) illustrates a waveform of the pixel signal Vpix, and (F) illustrates a waveform of the touch detection signal Vdet. In this example, as illustrated in (C) of FIG. 13, (n−2)th drive electrode COML(n−2) to (n+2)th drive electrode COML(n+2) are sequentially selected as a target of the display drive, and (k−4)th drive electrode COML(k−4) to (k+5)th drive electrode COML(k+5) are sequentially selected as a target of the touch detection drive.

In the display device with a touch detection function 1, during the display operation, the gate driver 12 applies the scan signal Vscan to the scan signal line GCL ((D) of FIG. 13), and the drive electrode driver 14 sequentially applies the display drive signal Vcomd to the drive electrode COML corresponding to the scan signal line GCL, and therefore the display scanning is performed (drive signals Vcom(n−2) to Vcom(n+2) in (C) of FIG. 13). In each one horizontal period (1H), the source driver supplies the pixel signal Vpix to one horizontal line which is applied with the scan signal Vscan and the display drive signal Vcomd, and therefore display for the one horizontal line is preformed. Moreover, during the touch detection operation, the drive electrode driver 14 applies, to six drive electrodes COML in this example, the touch detection drive signal Vcomt with a larger amplitude than that of the display drive signal Vcomd (the drive signals Vcom(k−4) to Vcom(k+5) in (C) of FIG. 13), and shifts, two by two in each one horizontal period, the drive electrodes COML to be applied with the touch detection drive signal Vcomt, and therefore the touch detection scanning is performed. In other words, the display scanning and the touch detection scanning are performed independently. In each one horizontal period (1H), the touch detection circuit 40 detects touch events based on the touch detection signal Vdet. The detail of the touch detection will be described below.

First, the drive electrode driver 14 applies the drive signal Vcom to the drive electrode COML at a timing t1. Specifically, the drive electrode driver 14 applies the display drive signal Vcomd (the drive signal Vcom(n−1)) to the (n−1)th drive electrode COML(n−1) ((C) of FIG. 13). At the same time, the drive electrode driver 14 applies the touch detection drive signal Vcomt (the drive signals Vcom(k−4) to Vcom(k+1)) to six drive electrodes COML, namely, (k−4)th drive electrode COML(k−4) to (k+1)th drive electrode COML(k+1) ((C) of FIG. 13). Accordingly, one horizontal period (1H) starts. At this time, the display drive signal Vcomd and the touch detection drive signal Vcomt are transmitted to the touch detection electrode TDL through the electrostatic capacitance to change the touch detection signal Vdet ((F) of FIG. 13).

Then, the gate driver 12 applies the scan signal Vscan to (n−1)th scan signal line GCL(n−1) at a timing t2 to change the scan signal Vscan(n−1) from low level to high level ((D) of FIG. 13).

Subsequently, the source driver 13 applies the pixel signal Vpix to the pixel signal line SGL at a timing t3 ((E) of FIG. 13) to perform display on one horizontal line. After the source driver 13 completes supply of the pixel signal Vpix, the gate driver 12 allows the scan signal Vscan(n−1) of (n−1)th scan signal line GCL(n−1) to change from high level to low level ((D) of FIG. 13).

Next, the A/D conversion section 43 A/D-converts, at a sampling timing ts1, the output signal of the analog LPF section 42 which has received the touch detection signal Vdet ((F) of FIG. 13).

Subsequently, the drive electrode driver 14 applies the drive signal Vcom to the drive electrodes COML at a timing t11. Specifically, the drive signal generation section 15 allows the display drive signal Vcomd to be inverted ((A) of FIG. 13), and the drive electrode driver 14 applies the display drive signal Vcomd (the drive signal Vcom(n)) to n-th drive electrode COML(n) ((C) of FIG. 13). Simultaneously, the drive signal generation section 15 allows the touch detection drive signal Vcomt to be inverted ((B) of FIG. 13), the drive electrode driver 14 applies the touch detection drive signal Vcomt (drive signals Vcom(k−2) to Vcom(k+3)) to six drive electrodes COML, namely, (k−2)th drive electrode COML(k−2) to (k+3)th drive electrode COML(k+3) ((C) of FIG. 13). Accordingly, subsequent one horizontal period (1H) starts. At this time, the display drive signal Vcomd and the touch detection drive signal Vcomt are transmitted to the touch detection electrode TDL through the electrostatic capacitance to change the touch detection signal Vdet ((F) of FIG. 13).

Then, the A/D conversion section 43 A/D-converts, at a sampling timing ts2, the output signal of the analog LPF section 42 which has received the touch detection signal Vdet ((F) of FIG. 13). The signal processing section 44 of the touch detection circuit 40 performs the touch detection based on a difference between a result of the A/D conversion at the sampling timing ts1 and a result of the A/D conversion at the sampling timing ts2.

Next, the gate driver 12 applies the scan signal Vscan to the n-th scan signal line GCL at a timing t12. After the scan signal Vscan(n) changes from low level to high level ((D) of FIG. 13), the source driver 13 applies the pixel signal Vpix to the pixel signal line SGL at a timing t13 ((E) of FIG. 13). Incidentally, in the example, since the display device with a touch detection function 1 performs inversion driving, the pixel signal Vpix applied by the source driver 13 has an alternately-inverted polarity, compared with the pixel signal Vpix in previous one horizontal period. After the source driver 13 completes supply of the pixel signal Vpix, the gate driver 12 allows the scan signal Vscan(n) of n-th scan signal line GCL(n) to change from high level to low level ((D) of FIG. 13).

By repeating the above-described operations, the display device with a touch detection function 1 sequentially scans over the entire surface of the liquid crystal display section 20 to perform the display operation on the entire surface, and sequentially scans over the entire surface of the touch detection section 30 to perform the touch detection operation on the entire surface.

In this way, in the display device with a touch detection function 1, the amplitude Vt of the touch detection drive signal Vcomt is set to be larger than the amplitude Vd of the display drive signal Vcomd. Therefore, compared with a case where the display drive signal Vcomd is also used as the touch detection drive signal, the change amount of the voltage of the touch detection signal Vdet is allowed to be large, and the touch detection sensitivity may be improved.

As described above, in the display device with a touch detection function 1, the display scanning and the touch detection scanning are performed independently of each other. Therefore, there is a case where the drive electrode COML as a target of the display drive and the drive electrode COML as a target of the touch detection drive are coincident with each other. At this time, in the display device with a touch detection function 1, the drive section 54 gives priority to the display drive. The operation of the drive section 54 will be described below.

(Detailed Operation of Drive Section 54)

Figure 14:
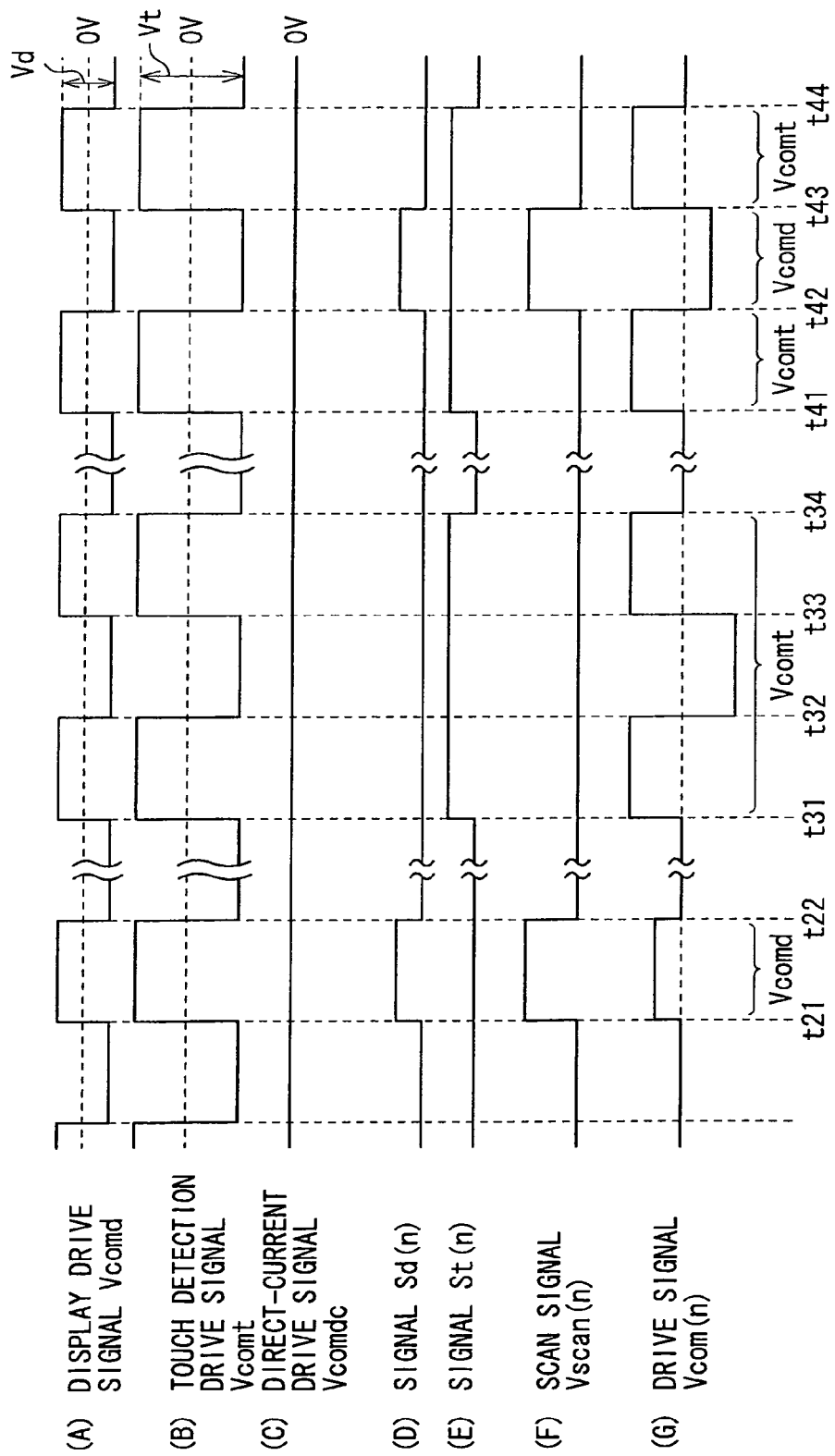
FIG. 14 is a timing waveform chart illustrating an operation example of a drive section according to the embodiment.

FIG. 14 illustrates an operation example of the drive section 54(n), where (A) illustrates a waveform of the display drive signal Vcomd, (B) illustrates a waveform of the touch detection drive signal Vcomt, (C) illustrates a waveform of the direct-current drive signal Vcomdc, (D) illustrates a waveform of the signal Sd(n), (E) illustrates a waveform of the signal St(n), (F) illustrates a waveform of the scan signal Vscan(n), and (G) illustrates a waveform of the drive signal Vcom(n).

During the display operation, the drive section 54 applies, based on the signal Sd output from the display scan section 52, the scan signal Vscan to the scan signal line GCL, and applies the display drive signal Vcomd to the drive electrodes COML. During the touch detection operation, the drive section 54 applies the touch detection drive signal Vcomt to the drive electrode COML based on the signal St output from the touch detection scan section 53. When the drive electrode COML as a target of the display drive and the drive electrode COML as a target of the touch detection drive are coincident with each other, the drive section 54 applies the display drive signal Vcomd to the coincident drive electrode COML. The detail thereof will be described below.

When the high-level signal Sd(n) is supplied from the display scan section 52, the drive section 54(*n*) allows the scan signal Vscan(n) to be at high level ((F) of FIG. 14) as illustrated in timings t21 to t22, and outputs the display drive signal Vcomd as the drive signal Vcom(n) ((G) of FIG. 14). Specifically, the gate buffer 55 amplifies the supplied signal Sd(n) to output the amplified signal as the scan signal Vscan (n) ((F) of FIG. 14). In addition, the drive signal control circuit 56 interprets the supply of the high-level signal Sd(n) and the low-level signal St(n) as an instruction of the display drive, and the drive signal buffer 57 then outputs the display drive signal Vcomd ((A) of FIG. 14) as the drive signal Vcom (n) ((G) of FIG. 14).

When the high-level signal St(n) is supplied from the touch detection scan section 53, the drive section 54(*n*) outputs the touch detection drive signal Vcomt as the drive signal Vcom (n) as illustrated in timings t31 to t34 ((G) of FIG. 14). Specifically, the drive signal control circuit 56 interprets the supply of the high-level signal St(n) and the low-level signal Sd(n) as an instruction of the touch detection drive, and the drive signal buffer 57 then outputs the touch detection drive signal Vcomt ((B) of FIG. 14) as the drive signal Vcom(n) ((G) of FIG. 14).

When the high-level signal Sd(n) from the display scan section 52 and the high-level signal St(n) from the touch detection scan section 53 are supplied, the drive section 54(*n*) allows the scan signal Vscan(n) to be at high-level ((F) of FIG. 14) and outputs the display drive signal Vcomd as the drive signal Vcom(n) ((G) of FIG. 14). Specifically, when the signal St(n) is turned to high level at a timing t41, the drive signal control circuit 56 interprets the combination of the high-level signal St(n) and the low-level signal Sd(n) as an instruction of the touch detection drive, and the drive signal buffer 57 then outputs the touch detection drive signal Vcomt ((B) of FIG. 14) as the drive signal Vcom(n) ((G) of FIG. 14). Subsequently, when the signal Sd(n) is turned to high level at a timing t42, the drive signal control circuit 56 interprets the combination of the high-level signal St(n) and the high-level signal Sd(n) as an instruction of the display drive, and the drive signal buffer 57 then outputs the display drive signal Vcomd ((A) of FIG. 14) as the drive signal Vcom(n) ((G) of FIG. 14). In other words, when receiving both instructions of the display drive and the touch detection drive, the drive signal control circuit 56 gives priority to the display drive and interprets the received instructions as an instruction of the display drive. Next, when the signal Sd(n) is turned to low level at a timing t43, the drive signal control circuit 56 interprets the combination of the high-level signal St(n) and the low-level signal Sd(n) as an instruction of the touch detection drive, and the drive signal buffer 57 then outputs the touch detection drive signal Vcomt ((B) of FIG. 14) as the drive signal Vcom(n) ((G) of FIG. 14).

In this way, in the display device with a touch detection function 1, when the drive electrode COML as a target of the display drive and the drive electrode COML as a target of the touch detection drive are coincident with each other, the drive section 54 gives priority to the display drive and applies the display drive signal Vcomd to the drive electrode COML. In other words, the drive electrode COML related to the horizontal line which is applied with the pixel signal Vpix by the source driver 13 is applied with the display drive signal Vcomd, and is not applied with the touch detection drive signal Vcomt. As a result, disturbance of display may be reduced.

[Effects]

As describe above, in the embodiment, the display drive signal and the touch detection drive signal are separately provided to the drive electrodes. Therefore, the touch detection drive signal is allowed to have amplitude larger than that of the display drive signal, and therefore the touch detection sensitivity may be improved.

Moreover, in the embodiment, when the drive electrode as a target of the display drive and the drive electrode as a target of the touch detection drive are coincident with each other, the display drive signal is applied to the coincident drive electrode so that disturbance of display is reduced.

Furthermore, in the embodiment, the display drive signal and the touch detection drive signal are generated in advance, and these drive signals are selectively applied to the drive electrode at the flick of a switch. Therefore, the plurality of drive signals may be selectively applied to the drive electrodes with a simple structure.

In the above-described embodiment, the scan drive section 50 simultaneously applies the touch detection drive signal Vcomt to six drive electrodes COML. However, the number of the drive electrode is not limited thereto, and alternatively, for example, the scan drive section 50 may simultaneously apply the touch detection drive signal Vcomt to five or less drive electrodes COML, or seven or more drive electrodes COML.

3. Application Examples

Next, application examples of the display device with a touch detection function described in the embodiment will be described with reference to FIG. 15 to FIG. 19G. The display device with a touch detection function of the above-described embodiment is applicable to electronic units in any fields, such as a television, a digital camera, a notebook personal computer, a portable terminal device such as a mobile phone, and a video camera. In other words, the display device with a touch detection function of the above-described embodiment is applicable to electronic units in various fields for displaying a picture signal input from outside or a picture signal internally generated as an image or a picture.

Application Example 1

Figure 15:
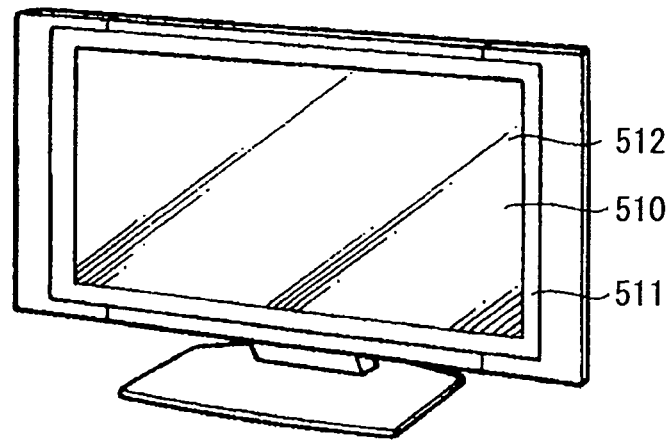
FIG. 15 is a perspective view illustrating an appearance configuration of an application example 1, out of display devices with a touch detection function applied with the embodiment.

FIG. 15 illustrates an appearance of a television to which the display device with a touch detection function of the above-described embodiment is applied. The television has, for example, a picture display screen section 510 including a front panel 511 and a filter glass 512. The picture display screen section 510 is configured of the display device with a touch detection function according to the above-described embodiment.

Application Example 2

Figure 16A:
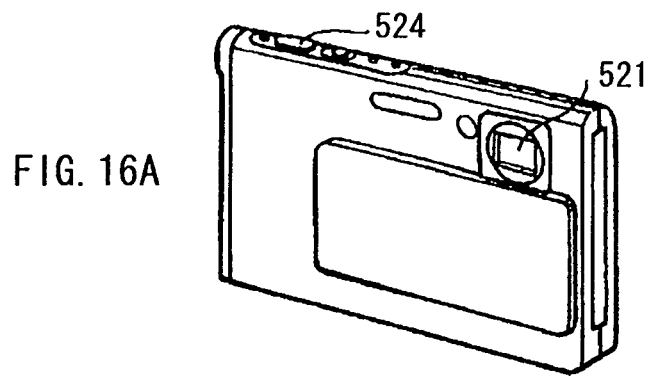
FIGS. 16A and 16B are perspective views illustrating an appearance configuration of an application example 2.
Figure 16B:
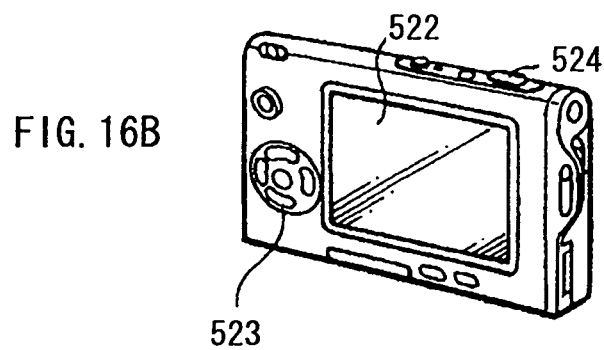

FIGS. 16A and 16B illustrate an appearance of a digital camera to which the display device with a touch detection function of the above-described embodiment is applied. The digital camera has, for example, a light emitting section for a flash 521, a display section 522, a menu switch 523, and a shutter button 524. The display section 522 is configured of the display device with a touch detection function according to the above-described embodiment.

Application Example 3

Figure 17:
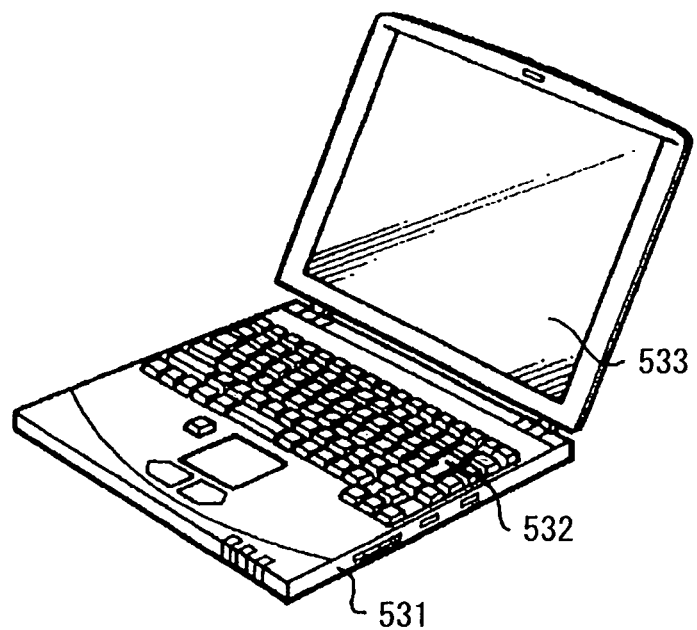
FIG. 17 is a perspective view illustrating an appearance configuration of an application example 3.

FIG. 17 illustrates an appearance of a notebook personal computer to which the display device with a touch detection function of the above-described embodiment is applied. The notebook personal computer has, for example, a main body 531, a keyboard 532 for operation of inputting characters and the like, and a display section 533 for displaying an image. The display section 533 is configured of the display device with a touch detection function according to the above-described embodiment.

Application Example 4

Figure 18:
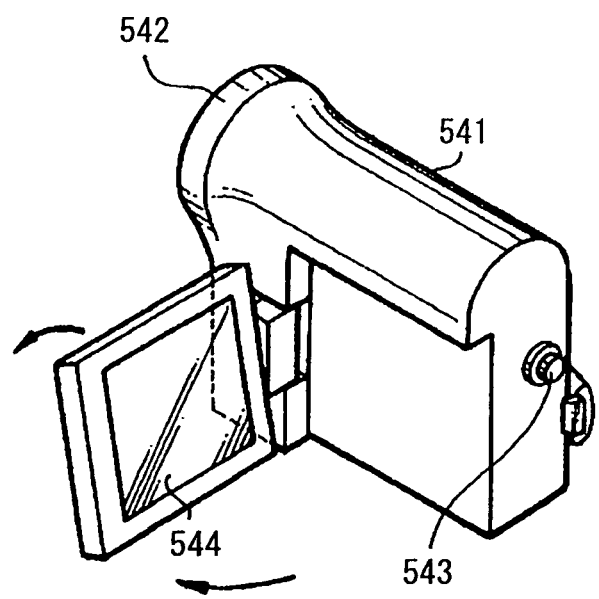
FIG. 18 is a perspective view illustrating an appearance configuration of an application example 4.
Figure 19:
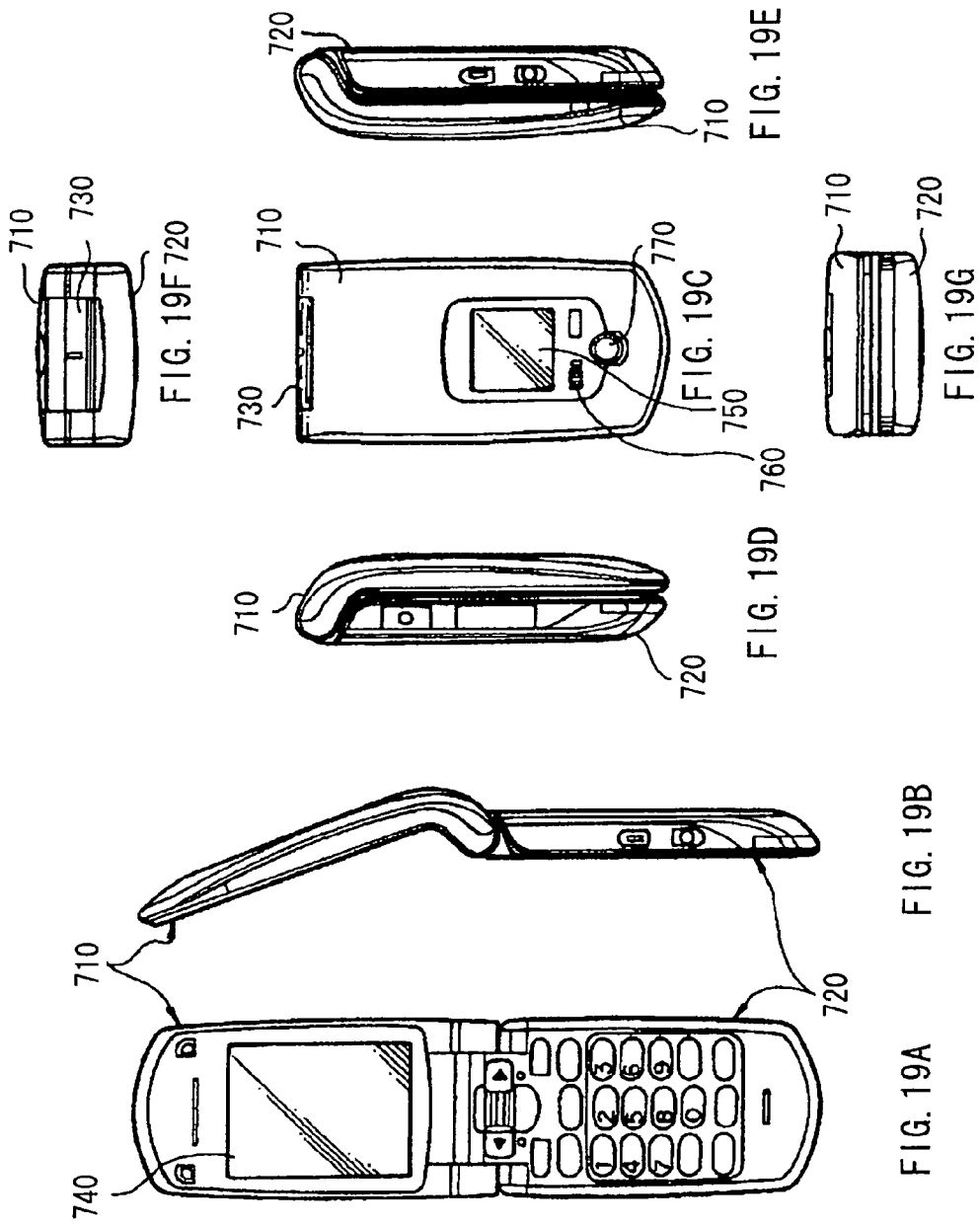
FIGS. 19A to 19G are front views, side views, a top view, and a bottom view illustrating an appearance configuration of an application example 5.

FIG. 18 illustrates an appearance of a video camera to which the display device with a touch detection function of the above-described embodiment is applied. The video camera has, for example, a main body 541, a lens 542 which is for shooting an object and is provided on the front side face of the main body 541, a shooting start/stop switch 543, and a display section 544. Also, the display section 544 is configured of the display device with a touch detection function according to the above-described embodiment.

Application Example 5

FIGS. 19A to 19G illustrate an appearance of a mobile phone to which the display device with a touch detection function of the above-described embodiment is applied. In the mobile phone, for example, a top-side enclosure 710 and a bottom-side enclosure 720 are joined by a joint section (a hinge section) 730. The mobile phone has a display 740, a sub-display 750, a picture light 760, and a camera 770. The display 740 or the sub-display 750 is configured of the display device with a touch detection function according to the above-described embodiment.

Hereinbefore, although the disclosure has been described with referring to the embodiment and the application examples to the electronic units, the disclosure is not limited thereto, and various modifications may be made.

Figure 20:
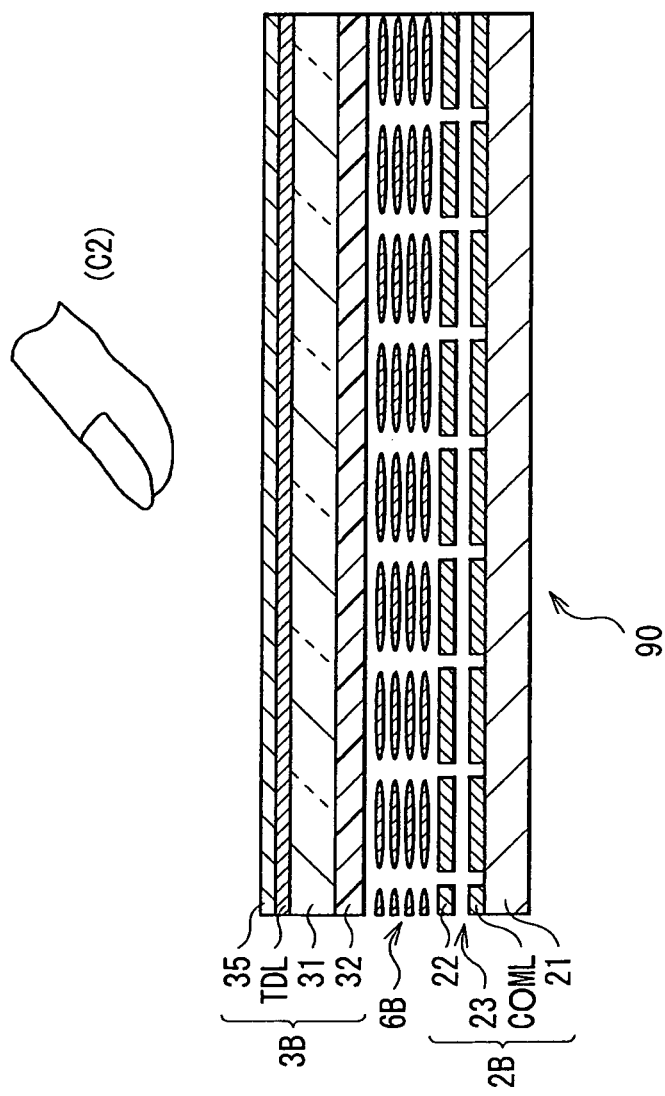
FIG. 20 is a sectional view illustrating a schematic cross-sectional configuration of a display section with a touch detection function according to a modification of the embodiment.

In the above-described embodiment and the like, the display section with a touch detection function 10 is configured by integrating the touch detection section 30 and the liquid crystal display section 20 using a liquid crystal of various modes such as TN, VA, and ECB. Alternatively, the touch detection section may be integrated with a liquid crystal display section using a liquid crystal of lateral-electric-field mode such as FFS (fringe field switching) and IPS (in-plane switching). For example, in a case where a liquid crystal in the lateral-electric-field mode is used, a display section with a touch detection function 90 may be configured as illustrated in FIG. 20. FIG. 20 illustrates an example of a cross-sectional configuration of a relative part in the display section with a touch detection function 90, and illustrates a state where a liquid crystal layer 6B is sandwiched between a pixel substrate 2B and a facing substrate 3B. Since names, functions, and the like of other parts are the same as in the case of FIG. 5, the description thereof is omitted. In the example, unlike the case of FIG. 5, the drive electrodes COML commonly used for display and for touch detection are formed directly on the TFT substrate 21, and configure a part of the pixel substrate 2B. The pixel electrodes 22 are arranged above the drive electrodes COML through the insulating layer 23. In this case, all dielectric bodies including the liquid crystal layer 6B, which are arranged between the drive electrodes COML and the touch detection electrodes TDL, contribute the formation of the capacitance element C1.

The present application contains subject matter related to that disclosed in Japanese Priority Patent Application JP 2010-186199 filed in the Japan Patent Office on Aug. 23, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A display device with a touch detection function comprising:
    a plurality of common drive electrodes arranged side by side to extend in one direction;
    a display element performing display, based on a pixel signal and a display drive signal;
    a touch detection element of electrostatic capacitance type detecting an external proximity object based on a touch detection drive signal with an amplitude larger than that of the display drive signal; and
    a scan drive section performing first scan drive and second scan drive, the first scan drive allowing the plurality of common drive electrodes to be sequentially supplied with the display drive signal in a time-divisional manner, and the second scan drive allowing the plurality of common drive electrodes to be sequentially supplied with the touch detection drive signal in a time-divisional manner,
    wherein the scan drive section includes:
        a drive signal control circuit to which a first select signal for selecting one of the common drive electrodes as a target of the first scan drive and a second select signal for selecting one of the common drive electrodes as a target of the second scan drive are supplied,
        a first switch allowing the target of the first scan drive to be supplied with the display drive signal,
        a second switch allowing the target of the second scan drive to be supplied with the touch detection drive signal, and
        a third switch allowing one of the common drive electrodes to be supplied with a direct-current potential,
    wherein the drive signal control circuit is configured to:
        when the first select signal is at a high level and the second select signal is not at the high level, turn on the first switch and turn off the second switch and the third switch to allow the target of the first scan drive to be supplied with the display drive signal,
        when the first select signal is not at the high level and the second select signal is at the high level, turn off the first switch and the third switch and turn on the second switch to allow the target of the second scan drive to be supplied with the touch detection drive signal,
        when the first select signal is at the high level and the second select signal is at the high level, turn on the first switch and turn off the second switch and the third switch to allow the target of the first scan drive to be supplied with the display drive signal, and when the first select signal is not at high level and the second select signal is not at high level, turn off the first switch and the second switch and turn on the third switch to allow one of the common drive electrodes to be supplied with the direct-current potential.

2. The display device according to claim 1, wherein turning-on of the third switch allows unselected common drive electrodes, which are not selected as a target of the first and second scan drive, to be supplied with the direct-current potential.

3. The display device according to claim 2, wherein the direct-current potential is equal to a time-averaged voltage value of the display drive signal.

4. The display device according to claim 1, wherein the touch detection drive signal is a rectangular wave signal with alternately-inverted polarity.

5. A display device comprising:
a plurality of common drive electrodes;
a display element performing display based on a pixel signal and a display drive signal;
a detection element performing detection based on a detection drive signal with an amplitude larger than that of the display drive signal; and
a scan drive section including a drive signal control circuit to which a first select signal for selecting one of the common drive electrodes and a second select signal for selecting one of the common drive electrodes are supplied, and a first switch, a second switch, and a third switch, turning-on of the first switch allowing one of the common drive electrodes to be supplied with the display drive signal, turning-on of the second switch allowing said one of the common drive electrodes to be supplied with the detection drive signal, and turning-on the third switch allowing one of the common electrodes to be supplied with a direct-current potential,
wherein the drive signal control circuit is configured to:
when the first select signal is at a high level and the second select signal is not at the high level, turn on the first switch and turn off the second switch and the third switch to allow the target of the first scan drive to be supplied with the display drive signal,
when the first select signal is not at the high level and the second select signal is at the high level, turn off the first switch and the third switch and turn on the second switch to allow the target of the second scan drive to be supplied with the touch detection drive signal,
when the first select signal is at the high level and the second select signal is at the high level, turn on the first switch and turn off the second switch and the third switch to allow the target of the first scan drive to be supplied with the display drive signal, and
when the first select signal is not at high level and the second select signal is not at high level, turn off the first switch and the second switch and turn on the third switch to allow one of the common drive electrodes to be supplied with the direct-current potential.

6. A drive circuit comprising:
a scan drive section performing first scan drive and second scan drive,
the first scan drive allowing a plurality of common drive electrodes to be sequentially supplied with a display drive signal in a time-divisional manner, and
the second scan drive allowing the plurality of common drive electrodes to be sequentially supplied with a touch detection drive signal with an amplitude larger than that of the display drive signal in a time-divisional manner, on a display section with a touch detection function including the plurality of common drive electrodes, a display element, and a touch detection element of electrostatic capacitance type, the plurality of common drive electrodes being arranged side by side to extend in one direction,
the display element performing display based on a pixel signal and the display drive signal, and
the touch detection element of electrostatic capacitance type detecting an external proximity object based on the touch detection drive signal,
wherein the scan drive section includes:
a drive signal control circuit to which a first select signal for selecting one of the common drive electrodes as a target of the first scan drive and a second select signal for selecting one of the common drive electrodes as a target of the second scan drive are supplied,
a first switch allowing the target of the first scan drive to be supplied with the display drive signal,
a second switch allowing the target of the second scan drive to be supplied with the touch detection drive signal, and
a third switch allowing one of the common drive electrodes to be supplied with a direct-current potential,
wherein the drive signal control circuit is configured to:
when the first select signal is at a high level and the second select signal is not at the high level, turn on the first switch and turn off the second switch and the third switch to allow the target of the first scan drive to be supplied with the display drive signal,
when the first select signal is not at the high level and the second select signal is at the high level, turn off the first switch and the third switch and turn on the second switch to allow the target of the second scan drive to be supplied with the touch detection drive signal,
when the first select signal is at the high level and the second select signal is at the high level, turn on the first switch and turn off the second switch and the third switch to allow the target of the first scan drive to be supplied with the display drive signal, and
when the first select signal is not at high level and the second select signal is not at high level, turn off the first switch and the second switch and turn on the third switch to allow one of the common drive electrodes to be supplied with the direct-current potential.

7. A driving method of a display device with a touch detection function, the driving method comprising:
performing a first scan drive operation for performing display, based on a pixel signal and a display drive signal, by allowing a plurality of common drive electrodes to be sequentially supplied with the display drive signal in a time-divisional manner, and allowing pixel electrodes, corresponding to the common drive electrodes which are under the supply of the display drive signal, to be sequentially supplied with the pixel signal in synchronization with the supply of the display drive signal, the plurality of common drive electrodes being arranged side by side to extend in one direction;
performing a second scan drive operation for detecting an external proximity object, based on a detection signal from a touch detection electrode, by allowing the plurality of common drive electrodes to be sequentially supplied with a touch detection drive signal with an amplitude larger than that of the display drive signal in a time-divisional manner, the touch detection electrode forming an electrostatic capacitance with each of the plurality of common drive electrodes; and controlling a scan drive section including a drive signal control circuit to which a first select signal for selecting one of the common drive electrodes as a target of the first scan drive and a second select signal for selecting one of the common drive electrodes as a target of the second scan drive are supplied, a first switch allowing the target of the first scan drive to be supplied with the display drive signal, and a second switch allowing the target of the second scan drive to be supplied with the touch detection drive signal, and a third switch allowing one of the common drive electrodes to be supplied with a direct-current potential such that:

when the first select signal is at a high level and the second select signal is not at a high level, the drive signal control circuit turns on the first switch and turns off the second switch and the third switch to allow the target of the first scan drive to be supplied with the display drive signal, when the first select signal is not at the high level and the second select signal is at the high level, the drive signal control circuit turns off the first switch and the third switch and turns on the second switch to allow the target of the second scan drive to be supplied with the detection drive signal, when the first select signal is at the high level and the second select signal is at the high level, the drive signal control circuit turns on the first switch and turns off the second switch and the third switch to allow the target of the first scan drive to be supplied with the display drive signal, and when the first select signal is not at high level and the second select signal is not at high level, turn off the first switch and the second switch and turn on the third switch to allow one of the common drive electrodes to be supplied with the direct-current potential.

8. An electronic unit including a display device with a touch detection function and a control section performing operation control with use of the display device with a touch detection function, the display device with a touch detection function comprising:

a plurality of common drive electrodes arranged side by side to extend in one direction;

a display element performing display based on a pixel signal and a display drive signal;

a touch detection element of electrostatic capacitance type detecting an external proximity object, based on a touch detection drive signal with an amplitude larger than that of the display drive signal; and a scan drive section performing first scan drive and second scan drive, the first scan drive allowing the plurality of common drive electrodes to be sequentially supplied with the display drive signal in a time-divisional manner, and the second scan drive allowing the plurality of common drive electrodes to be sequentially supplied with the touch detection drive signal in a time-divisional manner, wherein the scan drive section includes:

a drive signal control circuit to which a first select signal for selecting one of the common drive electrodes as a target of the first scan drive and a second select signal for selecting one of the common drive electrodes as a target of the second scan drive are supplied, a first switch allowing the target of the first scan drive to be supplied with the display drive signal, a second switch allowing the target of the second scan drive to be supplied with the touch detection drive signal, and a third switch allowing one of the common drive electrodes to be supplied with a direct-current potential, wherein the drive signal control circuit is configured to:

when the first select signal is at a high level and the second select signal is not at the high level, turn on the first switch and turn off the second switch and the third switch to allow the target of the first scan drive to be supplied with the display drive signal, when the first select signal is not at the high level and the second select signal is at the high level, turn off the first switch and the third switch and turn on the second switch to allow the target of the second scan drive to be supplied with the touch detection drive signal, when the first select signal is at the high level and the second select signal is at the high level, turn on the first switch and turn off the second switch and the third switch to allow the target of the first scan drive to be supplied with the display drive signal, and when the first select signal is not at high level and the second select signal is not at high level, turn off the first switch and the second switch and turn on the third switch to allow one of the common drive electrodes to be supplied with the direct-current potential.

\* \* \* \* \*